(12) United States Patent
Rios et al.

(10) Patent No.: US 10,584,403 B2
(45) Date of Patent: Mar. 10, 2020

(54) SURFACE-HARDENED ALUMINUM-RARE EARTH ALLOYS AND METHODS OF MAKING THE SAME

(71) Applicants: UT-Battelle, LLC, Oak Ridge, TN (US); University of Tennessee Research Foundation, Knoxville, TN (US); Iowa State University Research Foundation, Inc., Ames, IA (US); Eck Industries Incorporated, Manitowoc, WI (US)

(72) Inventors: Orlando Rios, Oak Ridge, TN (US); Sudarsanam Suresh Babu, Oak Ridge, TN (US); Ryan R. Dehoff, Knoxville, TN (US); Ryan Ott, Ames, IA (US); Alex J. Plotkowski, Oak Ridge, TN (US); Zachary C. Sims, Knoxville, TN (US); Niyanth Sridharan, Oak Ridge, TN (US); David Weiss, Manitowoc, WI (US); Hunter B. Henderson, Knoxville, TN (US)

(73) Assignees: UT-Battelle, LLC, Oak Ridge, TN (US); University of Tennessee Research Foundation, Knoxville, TN (US); Iowa State University Research Foundation, Inc., Ames, IA (US); Eck Industries Incorporated, Manitowoe, WI (US)

( * ) Notice: Subject to any disclaimer, the term of this patent is extended or adjusted under 35 U.S.C. 154(b) by 326 days.

(21) Appl. No.: 15/650,743

(22) Filed: Jul. 14, 2017

(65) Prior Publication Data
US 2018/0080102 A1    Mar. 22, 2018

Related U.S. Application Data

(60) Provisional application No. 62/396,490, filed on Sep. 19, 2016, provisional application No. 62/396,485, filed on Sep. 19, 2016.

(51) Int. Cl.
*C22C 23/06* (2006.01)
*C22C 21/08* (2006.01)
(Continued)

(52) U.S. Cl.
CPC ............ *C22C 23/06* (2013.01); *B22D 21/007* (2013.01); *B22F 3/1055* (2013.01);
(Continued)

(58) Field of Classification Search
CPC .......... C22C 21/00; C22C 21/06; C22C 21/08
See application file for complete search history.

(56) References Cited

U.S. PATENT DOCUMENTS 3,252,841 A    5/1966  Foerster
4,915,869 A    4/1990  Aubert et al.
(Continued)

FOREIGN PATENT DOCUMENTS

DE    10 2011 111365 A1    2/2013
JP    H07 268597 A         10/1995
JP    3 392509 B2           3/2003

OTHER PUBLICATIONS

Audebert, et al., "Production of Glassy Metallic Layers by Laser Surface Treatment," *Scripta Materialia* 2003, 48(3):281-286.
(Continued)

*Primary Examiner* — C Melissa Koslow
(74) *Attorney, Agent, or Firm* — Klarquist Sparkman, LLC

(57) ABSTRACT

Embodiments of surface-hardened aluminum-rare earth alloys and methods of making the alloys are disclosed. In some embodiments, the alloy comprises aluminum and 4 wt % to 60 wt % of a rare earth component X having a maximum solid solubility of ≤0.5 wt % in aluminum. The surface-hardened alloy component has an alloy bulk portion and a hardened alloy surface portion. At least a portion of the
(Continued)

hardened alloy surface portion has a Vickers hardness that is at least 30% greater than a Vickers hardness of the alloy bulk portion.

20 Claims, 27 Drawing Sheets
(5 of 27 Drawing Sheet(s) Filed in Color)

(51) Int. Cl.
| | |
|---|---|
| C22C 21/06 | (2006.01) |
| B33Y 10/00 | (2015.01) |
| B33Y 80/00 | (2015.01) |
| B23K 26/354 | (2014.01) |
| B22D 21/00 | (2006.01) |
| C22C 1/03 | (2006.01) |
| C22C 28/00 | (2006.01) |
| C22C 30/06 | (2006.01) |
| C21D 1/10 | (2006.01) |
| C22C 21/00 | (2006.01) |
| C22F 1/04 | (2006.01) |
| B22F 3/105 | (2006.01) |
| C22C 1/04 | (2006.01) |

(52) U.S. Cl.
CPC ............ *B23K 26/354* (2015.10); *B33Y 10/00* (2014.12); *B33Y 80/00* (2014.12); *C21D 1/10* (2013.01); *C22C 1/03* (2013.01); *C22C 1/0416* (2013.01); *C22C 21/00* (2013.01); *C22C 21/06* (2013.01); *C22C 21/08* (2013.01); *C22C 28/00* (2013.01); *C22C 30/06* (2013.01); *C22F 1/04* (2013.01); *Y02P 10/253* (2015.11)

(56) References Cited

U.S. PATENT DOCUMENTS

| | | |
|---|---|---|
| 5,037,608 A | 8/1991 | Tarcy et al. |
| 5,431,751 A | 7/1995 | Okochi et al. |
| 2003/0183306 A1 | 10/2003 | Hehmann et al. |
| 2004/0238150 A1 | 12/2004 | Adachi et al. |
| 2012/0152414 A1 | 6/2012 | Che et al. |
| 2014/0326368 A1 | 11/2014 | Okamoto |
| 2016/0053345 A1 | 2/2016 | Wilbur et al. |

OTHER PUBLICATIONS

Chen, et al., "Mechanical Properties of Nanometric $Al_2O_3$ Particulate-Reinforced $Al$—$Al_{11}Ce_3$ Composites Produced by Friction Stir Processing," *Materials Transactions* 2010, 51(5):933-938.

International Search Report and Written Opinion, dated Oct. 20, 2017, issued in corresponding International Application No. PCT/US2017/042203.

International Search Report and Written Opinion, dated Oct. 20, 2017, issued in related International Application No. PCT/US2017/042208.

Graham et al., "Coarsening of Eutectic Microstructures at Elevated Temperatures," *Transactions of the Metallurgical Society of AIME*, vol. 236, pp. 94-102, Jan. 1966.

Office Action, dated Jul. 2, 2019, issued in U.S. Appl. No. 15/650,664.

Plotkowski et al., "Evaluation of an Al—Ce alloy for laser additive manufacturing," *Acta Materialia* 2017, 126, pp. 507-519, published online Dec. 27, 2016.

Plotkowski et al., "Corrigendum to Evaluation of an Al—Ce alloy for additive manufacturing," *Acta Materialia*, 159, pp. 439-441, 2018.

Abbas, "Effect of high power diode laser surface melting on wear resistance of magnesium alloys," *Wear*, vol. 260, pp. 175-180, May 10, 2005.

International Search Report and Written Opinion issued for International Application No. PCT/US2016/41293 dated Nov. 17, 2016.

Jun et al., "Characterization and wear resistance of laser surface melting AZ91 D alloy," *Journal of Alloys and Compounds*, vol. 455, pp. 142-147, Jan. 16, 2007.

Sims et al., "Cerium-Based, Intermetallic-Strengthened Aluminum Casting Alloy: High-Volume Co-product Development," *JOM*, 68(7): 1940-1947, May 23, 2016.

Sims et al., "Characterization of Near Net-Shape Castable Rare Earth Modified Aluminum Alloys for High Temperature Application," *Light Metals*, ed. Edward Williams, pp. 111-114, 2016.

Tomida et al., "Improvement in wear resistance of hyper-eutectic Al—Si cast alloy by laser surface remelting," *Surface and Coatings Technology*, vol. 169-170, pp. 468-471, 2003.

Trevisan, "On the Selective Laser Melting (SLM) of the AlSi10Mg Alloy: Process, Microstructure, and Mechanical Properties," *Materials*, 10, 76, 23 pages, Jan. 2017.

Yilmaz et al., "The microstructure and mechanical properties of unidirectionally solidified Al—Si alloys," *Journal of Materials Science*, vol. 24, pp. 2065-2070, 1989.

Zhang et al., "Effect of substituting cerium-rich mischmetal with lanthanum on mictrostructure and mechanical properties of die-cast Mg—Al—Re alloys," *Materials and Design*, vol. 30, pp. 2372-2378, Nov. 7, 2008.

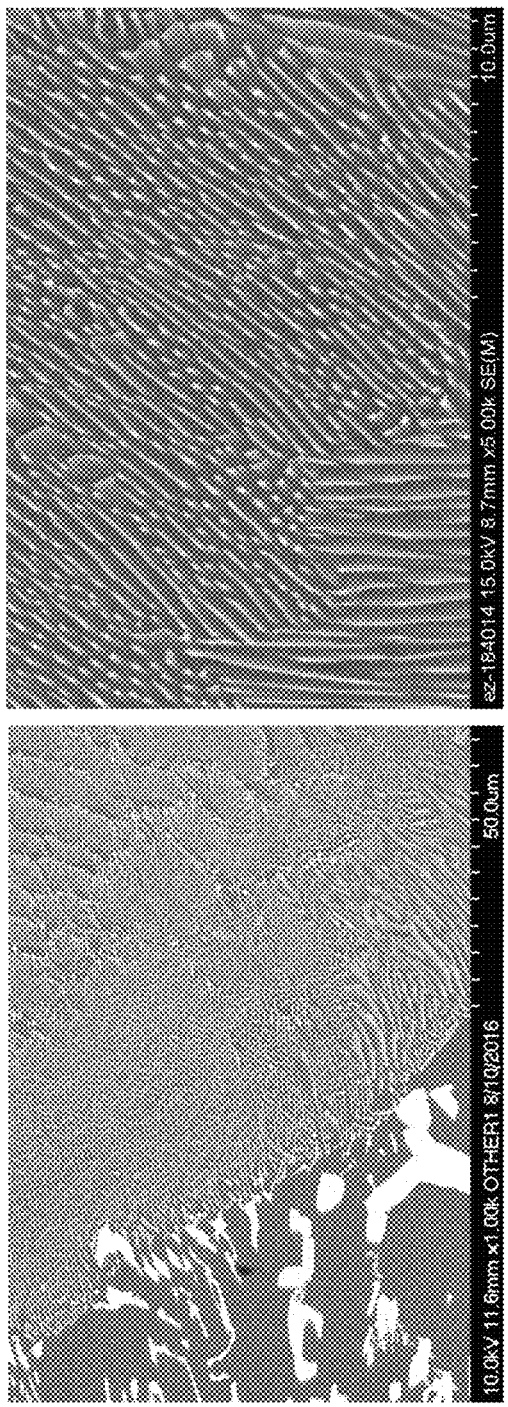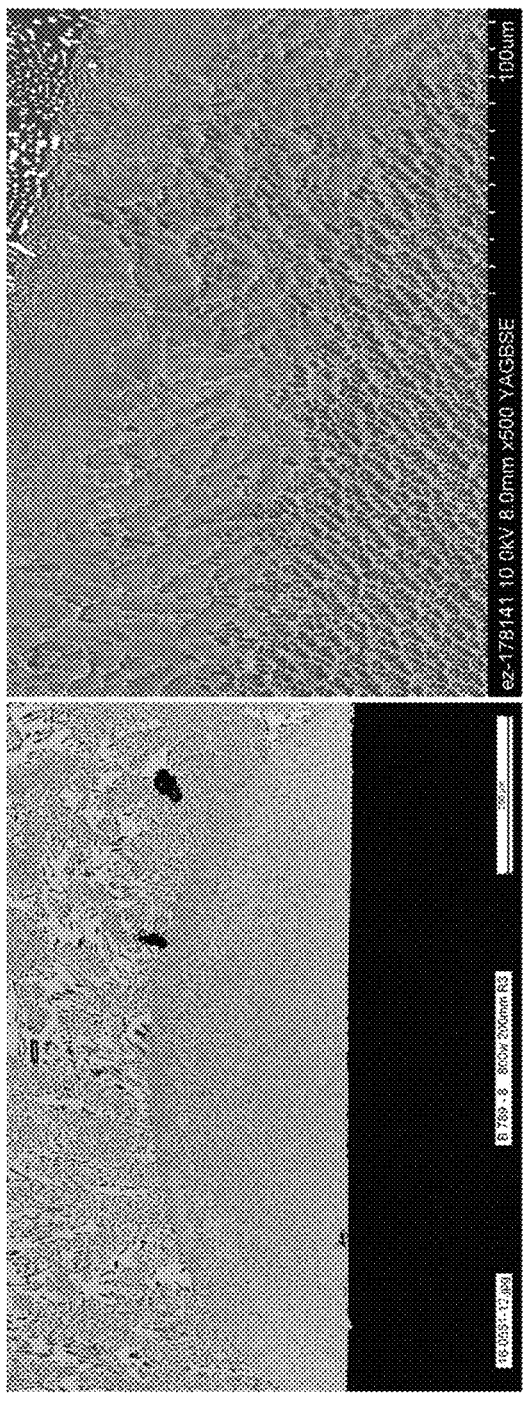
FIG. 21G
FIG. 21F
FIG. 22B
FIG. 22A

SURFACE-HARDENED ALUMINUM-RARE EARTH ALLOYS AND METHODS OF MAKING THE SAME

CROSS REFERENCE TO RELATED APPLICATIONS

This application claims the benefit of the earlier filing date of U.S. Provisional Application No. 62/396,485, filed Sep. 19, 2016, and U.S. Provisional Application No. 62/396,490, filed Sep. 19, 2016, each of which is incorporated in its entirety herein by reference.

ACKNOWLEDGMENT OF GOVERNMENT SUPPORT

This invention was made with government support under Contract Nos. DE-AC05-00OR22725 and DE-AC02-07CH11358 awarded by the United States Department of Energy. The government has certain rights in the invention.

FIELD

This disclosure concerns surface-hardened aluminum-rare earth alloys and methods of making the alloys.

PARTIES TO JOINT RESEARCH AGREEMENT

The invention arose under an agreement between UT-Battelle, LLC, University of Tennessee Research Foundation, Iowa State University of Science and Technology and Eck Industries, Inc., funded by the Critical Materials Institute of the United States Department of Energy, which agreement was in effect on or before the effective filing date of the claimed invention.

BACKGROUND

Aluminum alloys are useful for weight-critical applications, but are presently limited to applications below 230° C. due to rapid fall-off or degradation in mechanical characteristics as temperature increases. There is a need for aluminum alloy components that are useful for high-temperature applications without undesirable changes in mechanical characteristics, e.g., wear resistance.

SUMMARY

Embodiments of surface-hardened aluminum-rare earth alloys and methods of making the alloys are disclosed. Embodiments of the disclosed surface-hardened alloy components comprise an alloy comprising aluminum and 4 wt % to 60 wt %, such as 4 wt % to 20 wt %, of a rare earth component X having a maximum solid solubility of ≤0.5 wt % in aluminum. In certain embodiments, the rare earth component X has a maximum solid solubility of ≤0.1 wt % in aluminum. The surface-hardened alloy component has an alloy bulk portion and a hardened alloy surface portion. At least a portion of the hardened alloy surface portion has a Vickers hardness at a temperature within a range of 20-25° C. that is at least 30% greater than a Vickers hardness of the alloy bulk portion at the temperature within the range of 20-25° C., as measured by ASTM method E384, as known at the time of this filing. In any or all of the above embodiments, the hardened alloy surface portion may have an average thickness of from 10 μm to 1.5 mm.

The alloy typically comprises a bulk metallic phase and an intermetallic phase. In some embodiments, the alloy comprises from 5 wt % to 30 wt % of the intermetallic phase. When the alloy is a binary alloy of aluminum and the rare earth component X, the intermetallic phase may be an $Al_{11}X_3$ intermetallic phase. In any or all of the above embodiments, 95 wt % to 100 wt % of the rare earth component X in the alloy may be present in the intermetallic phase.

In any or all of the above embodiments, the alloy bulk portion comprises a bulk microstructure comprising bulk morphological features, the hardened alloy surface portion comprises a surface microstructure comprising surface morphological features, and the bulk morphological features may have (i) an average thickness at least 2-fold greater than an average thickness of corresponding surface morphological features, (ii) an average spacing (e.g., eutectic interlamellar spacing) at least 2-fold greater than an average spacing of the corresponding surface morphological features, (iii) an average cross-section in a narrow dimension at least 2-fold greater than an average cross-section in a narrow dimension of the corresponding surface morphological features, or (iv) any combination of (i), (ii), and (iii). In some embodiments, the surface morphological features have a cross-section in a narrow dimension with an average diameter of 500 nm. In any or all of the above embodiments, the bulk morphological features and the surface morphological features may comprise aluminum regions and dendrites comprising an intermetallic phase. In any or all of the foregoing embodiments, the average thickness of the surface morphological features, the average spacing of the surface morphological features, the average cross section of the surface morphological features, or any combination thereof, may increase by less than 100%, such as less than 50% or less than 20% after subjecting the surface-hardened alloy component to a temperature of 300° C. for 24 hours.

In any or all of the above embodiments, the rare earth component X may be Ce, La, mischmetal, or a combination thereof. In some embodiments, the alloy further comprises Mg, Si, or a combination thereof. In certain embodiments, the alloy comprises 4 wt % to 60 wt % Ce, La, mischmetal, or a combination thereof, 0 wt % to 15 wt % Mg, 0 wt % to 12 wt % Si, 0 wt % to 6 wt % Fe, 0 wt % to 5 wt % Ni, and 0 wt % to 6 wt % Zn, with the balance being aluminum. In particular embodiments, the alloy comprises 4 wt % to 20 wt % Ce.

Some embodiments of a method for making the disclosed surface-hardened alloy components include hardening at least a portion of an alloy surface of a prefabricated alloy component comprising aluminum and from 4 wt % to 60 wt % of a rare earth component X having a maximum solid solubility of 0.5 wt % in the aluminum by melting the portion of the alloy surface and allowing the melted alloy surface to cool and resolidify, thereby forming a surface-hardened alloy component having an alloy bulk portion and a hardened alloy surface portion, at least a portion of the hardened alloy surface portion having a Vickers hardness at ambient temperature that is at least 30% greater than a Vickers hardness of the alloy bulk portion at ambient temperature, as measured by ASTM method E384. The method may further include forming the prefabricated alloy component by casting, forging, machining, extruding, or stamping the alloy to form the prefabricated alloy component.

In certain embodiments, melting the portion of the alloy surface comprises moving a laser or an electron beam having a sufficient power to melt the alloy surface of the prefabricated alloy across the alloy surface at a rate sufficient to melt a portion of the alloy surface exposed to the laser or the electron beam. The laser or electron beam may be moved across the alloy surface at a rate sufficient to melt the portion of the alloy surface to an average thickness of from 10 μm to 1.5 mm. In any or all of the foregoing embodiments, (i) the laser may have a power of 100 W to 50 kW; (ii) the rate of movement of the laser across the alloy surface may be within a range of from 100 mm/minute to 5 m/second; (iii) the power and the rate of movement of the laser may be selected to provide a molten spot size having an average diameter of from 100 μm to 15 mm in the portion of the alloy surface exposed to the laser; or (iv) any combination of (i), (ii), and (iii).

In an independent embodiment, melting the portion of the alloy surface comprises inducing an electrical current in the portion of the alloy surface, the electrical current having sufficient magnitude to provide resistive-heating and melting of the portion of the alloy surface.

The foregoing and other objects, features, and advantages of the invention will become more apparent from the following detailed description, which proceeds with reference to the accompanying figures.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 21A-21G are an optical micrograph of an exemplary melt region on a surface-hardened Al-12Ce alloy (21A), an SEM micrograph showing eutectic growth near the edge of the laser-melted region (21B), an SEM micrograph of eutectic colonies in the laser-melted region (21C), an SEM micrograph showing the evolution from eutectic to dendritic/cellular growth near the center of the laser-melted region (21D), a high-magnification SEM micrograph of aluminum dendrites/cells near the center of the laser-melted region, with Al—Al$_{11}$Ce$_3$ in the interdendritic/intercellular regions (21E), an SEM micrograph of the edge of the laser-melted region after heat treatment at 300° C. for 24 hours (21F), and an SEM micrograph of the eutectic microstructure in the laser-melted region after heat treatment at 300° C. for 24 hours showing no signs of microstructural coarsening (21G); the melt region was obtained with an 800 W laser at a rate of 100 mm/minute.

FIGS. 22A-22F are an optical micrograph of an exemplary melt region on a surface-hardened Al-12Ce alloy (22A), an SEM micrograph showing the differences in microstructure with position within the laser-melted region (22B), an SEM micrograph of the eutectic microstructure in the laser-melted region (22C), an SEM micrograph of dendritic aluminum in the laser-melted region (22D), and SEM micrographs of the eutectic microstructure near the edge of the laser-melted region after heat treatment at 300° C. for 24 hours, showing no signs of microstructural coarsening (22E, 22F); the melt region was obtained with an 800 W laser at a rate of 200 mm/minute.

DETAILED DESCRIPTION

Figure 1A:
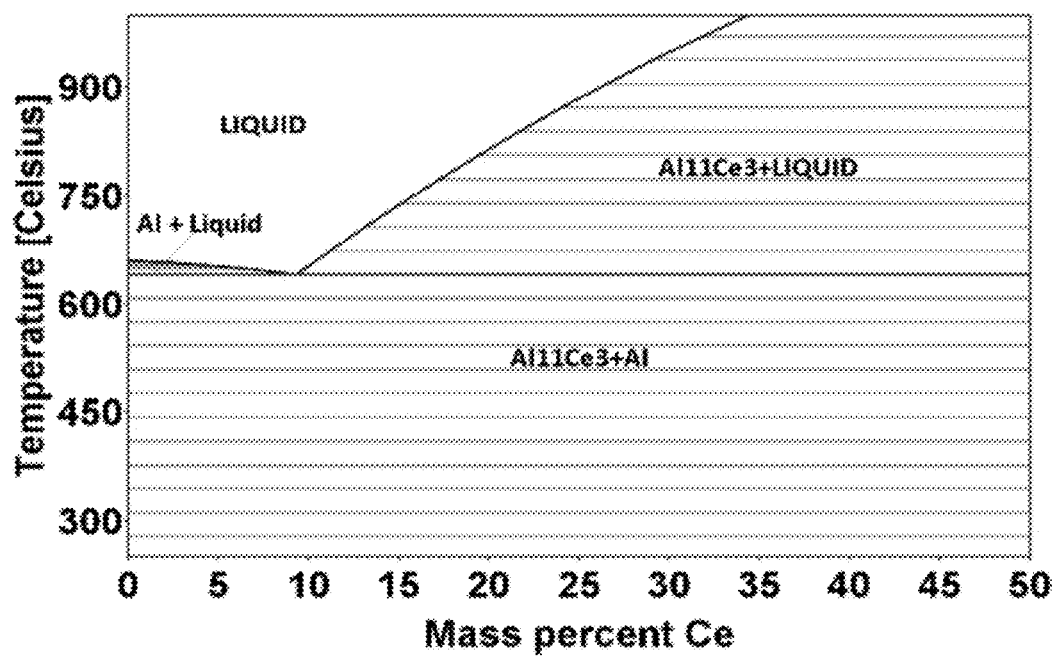
FIGS. 1A-1C show the aluminum rich sides of the Al—Ce phase diagram (1A) and the Al—La phase diagram (1B), and the Al—Ce—La liquidus projection.

Embodiments of surface-hardened aluminum-rare earth alloys and methods of making the alloys are disclosed. In some embodiments, the alloy comprises aluminum and from 4 wt % to 60 wt % of a rare earth component.

I. Definitions and Abbreviations

The following explanations of terms and abbreviations are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

Unless otherwise indicated, all numbers expressing quantities of components, percentages, temperatures, times, and so forth, as used in the specification or claims are to be understood as being modified by the term "about." Accordingly, unless otherwise implicitly or explicitly indicated, or unless the context is properly understood by a person of ordinary skill in the art to have a more definitive construction, the numerical parameters set forth are approximations that may depend on the desired properties sought and/or limits of detection under standard test conditions/methods as known to those of ordinary skill in the art. When directly and explicitly distinguishing embodiments from discussed prior art, the embodiment numbers are not approximates unless the word "about" is recited.

Although there are alternatives for various components, parameters, operating conditions, etc. set forth herein, that does not mean that those alternatives are necessarily equivalent and/or perform equally well. Nor does it mean that the alternatives are listed in a preferred order unless stated otherwise.

Definitions of common terms in chemistry may be found in Richard J. Lewis, Sr. (ed.), *Hawley's Condensed Chemical Dictionary*, published by John Wiley & Sons, Inc., 1997 (ISBN 0-471-29205-2).

In order to facilitate review of the various embodiments of the disclosure, the following explanations of specific terms are provided:

Alloy: A solid or liquid mixture of two or more metals, or of one or more metals with certain metalloid elements, e.g., silicon.

Alloy surface portion: As used herein, the term alloy surface portion refers to a surface (e.g., an outer surface or an inner surface, such as the inner surface of a pipe) of an alloy component prior to addition of any other layers, such as coatings or other materials (e.g., paints, enamels, anti-corrosion coatings, anti-wear coatings, fire-resistance materials, and the like). The term "hardened alloy surface portion" refers to a surface portion that has been subjected to a hardening treatment as disclosed herein.

Alloy bulk portion: As used herein, the term alloy bulk portion refers to the portion of an alloy component that is not included in the hardened alloy surface portion, where the hardened alloy surface portion has an average thickness of from 10 μm to 15 mm.

Aluminum matrix: The primary aluminum phase in the alloy, i.e., the alloy phase having aluminum atoms arranged in a face-centered cubic structure, optionally with other elements in solution in the aluminum structure.

Bulk morphology: As used herein, the term bulk morphology refers to regions with morphological features commensurate with expected morphology resulting from selecting pre-fabrication techniques (e.g. casting, forging, and extrusion) within the alloy. In other words, bulk morphology refers to regions of the alloy that have not been surface hardened, wherein the morphology is determined by the pre-fabrication process.

Bulk phase: As used herein, the term bulk phase refers to regions of aluminum face-centered cubic structure, potentially with other elements in solid solution. The terms bulk phase and aluminum matrix may be used interchangeably with respect to the disclosed aluminum alloys.

Dendrite: A characteristic tree-like structure of crystals that grows as molten metal solidifies.

Ductility: A solid material's ability to deform under tensile stress, often characterized by the material's ability to be stretched into a wire. Ductility may be quantified by the percent elongation in a tensile test, defined as the maximum elongation of the gage length divided by the original gage length:

$$\text{percent elongation} = \frac{\text{final gage length} - \text{initial gage length}}{\text{initial gage length}} \times 100$$

The test is performed by providing a test piece of the solid material, such as a rod, marking an initial gage length, applying a tensile force to elongate the test piece until it fractures through a "neck," and then fitting the broken parts together and measuring the final gage length (i.e., the distance between the marks made initially). Alternatively, or in addition, ductility can be measured in terms of reduction of the cross-sectional area of the test piece at the plane of fracture, wherein the minimum final cross-sectional area is measured after fracture:

$$\text{percent reduction of area} = \frac{\text{area of original cross section} - \text{minimum final area}}{\text{area of original cross section}} \times 100$$

As used herein, the term "bulk ductility" refers to the ductility of the alloy bulk portion of a cast component other than a hardened surface portion of the cast component.

Eutectic composition or structure: A homogeneous solid mix of atomic and/or chemical species forming a super lattice having a unique molar ratio between the components. At this molar ratio, the mixtures melt as a whole (i.e., all components of the mixture melt simultaneously) at a specific temperature (or narrow (e.g., 1-2 degrees) temperature range)—the eutectic temperature. At other atomic ratios, one component of the mixture will melt at a first temperature and the other component(s) will melt at other temperatures.

Intermetallic phase: A solid-state compound containing two or more metallic elements and exhibiting metallic bonding, defined stoichiometry and/or ordered crystal structure, optionally with one or more non-metallic elements. In some instances, an alloy may include regions of a single metal and regions of an intermetallic phase. In a binary alloy comprising aluminum and a rare earth component X, where X is Ce, La, mischmetal, or a combination thereof, the intermetallic phase may have a formula $Al_{11}X_3$. Ternary and quaternary alloys may have other intermetallic phases such as, for example, AlCeSi.

Lamella: A thin layer or platelike structure.

Microstructure: The fine structure of an alloy (e.g., grains, cells, dendrites, rods, laths, lamellae, precipitates) that can be visualized and examined with a microscope at a magnification of at least 25×. Microstructure can also include nanostructure, i.e., structure that can be visualized and examined with more powerful tools, such as electron microscopy, atomic force microscopy, X-ray computed tomography, etc.

Mischmetal: An alloy of rare earth elements, typically comprising 47-70 wt % cerium and from 25-45 wt % lanthanum. Mischmetal may further include small amounts of neodymium, praseodymium, and/or trace amounts (i.e., less than 1 wt %) of other rare earth elements, and may include small amounts (i.e., up to a total of 15 wt %) of impurities such as Fe or Mg. In some examples, mischmetal comprises 47-70 wt % Ce, 25-40 wt % La, 0.1-7 wt % Pr, 0.1-17 wt % Nd, up to 0.5 wt % Fe, up to 0.2 wt % Si, up to 0.5 wt % Mg, up to 0.02 wt % S, and up to 0.01 wt % P. In certain examples, mischmetal comprises 50 wt % cerium, 25-30 wt % La, with the balance being other rare-earth metals. In one example, mischmetal comprises 50 wt % Ce, 25 wt % La, 15 wt % Nd, and 10 wt % other rare earth metals and/or iron. In an independent example, mischmetal comprises 50 wt % Ce, 25 wt % La, 7 wt % Pr, 3 wt % Nd, and 15 wt % Fe.

Rare earth component: As used herein, the term rare earth component refers to a component comprising one or more rare earth elements. As defined by IUPAC and as used herein, the term rare earth element includes the 15 lanthanide elements, scandium, and yttrium—Sc, Y, La, Ce, Pr, Nd, Sm, Eu, Gd, Tb, Dy, I, Er Tm, Yb, or Lu.

Raster: The term raster refers to forming a scan pattern of parallel lines. For example, a laser or an induction coil can be moved across the surface of an alloy component in a pattern of overlapping or non-overlapping parallel lines.

Vickers hardness: A hardness measurement determined by indenting the test material with an indenter subjected to a load of 1 to 100 kgf for a period of time. Vickers hardness may be expressed in units of HV.

Weld (or melt) region (or pool): As used herein, the terms "weld region" or "melt region" refer to a region melted (e.g., by exposure to a laser or induction melting) and resolidified. The terms weld region, weld pool, melt region, and melt pool are used interchangeably.

Yield strength or yield stress: The stress a material can withstand without permanent deformation; the stress at which a material begins to deform plastically II. Surface-Hardened Alloys Certain embodiments of the disclosed surface-hardened alloys include aluminum and 4 wt % to 60 wt % of a rare earth component X having a maximum solid solubility of ≤1 wt % in aluminum, such as a maximum solid solubility of 0.5 wt % in aluminum. The rare earth component X may be Sc, Y, La, Ce, Pr, Nd, Sm, Eu, Gd, Tb, Dy, Ho, Er Tm, Yb, or Lu, or any combination thereof. In some embodiments, the alloy comprises 4 wt % to 8 wt %, 8 wt % to 12 wt %, 12 wt % to 20 wt %, 20 wt % to 35 wt %, 35 wt % to 60 wt %, 35 wt % to 52 wt %, or 52 wt % to 60 wt % of the rare earth element X. In certain embodiments, the alloy comprises 4 wt % to 45 wt %, 4 wt % to 35 wt %, 4 wt % to 20 wt %, 6 wt % to 18 wt %, 8 wt % to 16 wt %, or 10 wt % to 14 wt % of the rare earth element X. In certain examples, the alloy comprises 8 wt %, 9 wt %, 10 wt %, 11 wt %, 12 wt %, 13 wt %, 14 wt %, 15 wt %, or 16 wt % of the rare earth component X. The notation "Al-aX" indicates the composition of the alloy, where a is the percent by weight of the rare earth component X in the Al-aX alloy. For example, Al-12Ce indicates an alloy of 12 wt % Ce with the balance being aluminum.

The rare earth component X has a maximum solid solubility of ≤0.5 wt % in aluminum, such as a maximum solid solubility of ≤0.1 wt %, ≤0.01 wt %, ≤0.001 wt %, ≤1×10$^{-4}$ wt %, or even ≤1×10$^{-5}$ wt % in aluminum. In some embodiments, the rare earth component X has a maximum solid solubility in aluminum within a range of 1×10$^{-10}$ wt % to 1 wt %, 1×10$^{-10}$ wt % to 0.1 wt %, 1×10$^{-8}$ wt % to 0.01 wt %, 1×10$^{-8}$ wt % to 0.001 wt %, 1×10$^{-8}$ wt % to 1×10$^{-4}$ wt %, or 1×10$^{-7}$ wt % to 1×10$^{-5}$ wt %. This characteristic is in stark contrast to other metals and/or metalloids, such as magnesium and silicon, which are soluble or very soluble in aluminum. It can also be said that aluminum and the rare earth component X have low mutual solid solubility, i.e., aluminum also has a maximum solid solubility of ≤0.5 wt % in the molten rare earth component X.

Figure 1B:
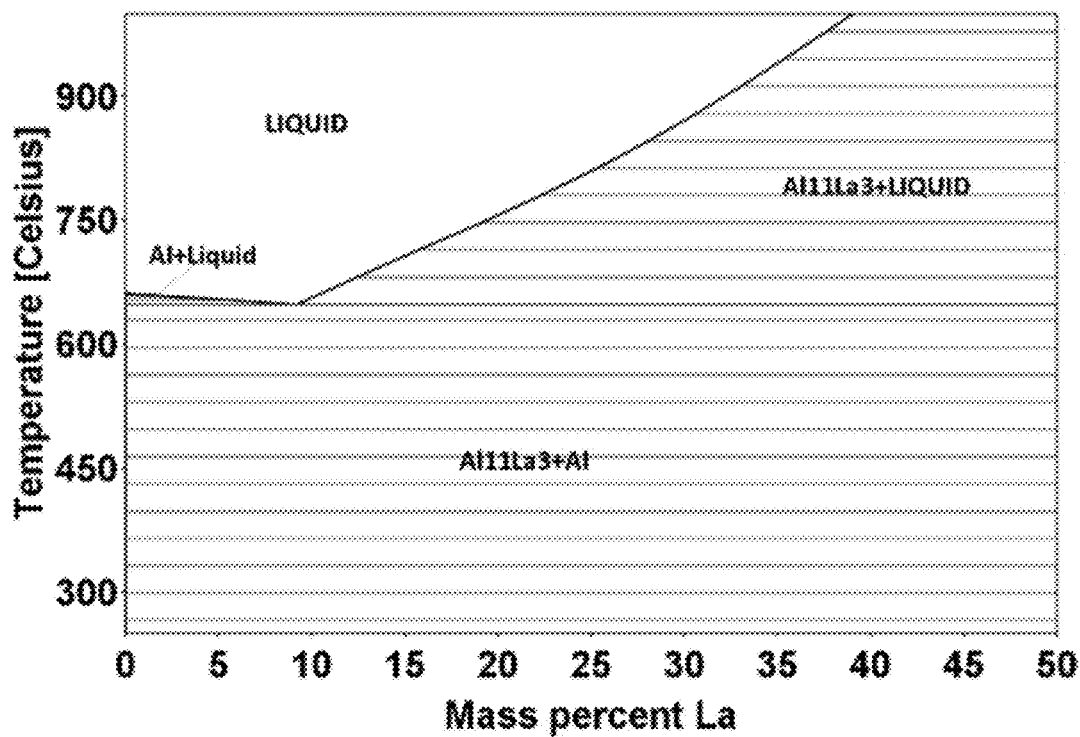
Figure 1C:
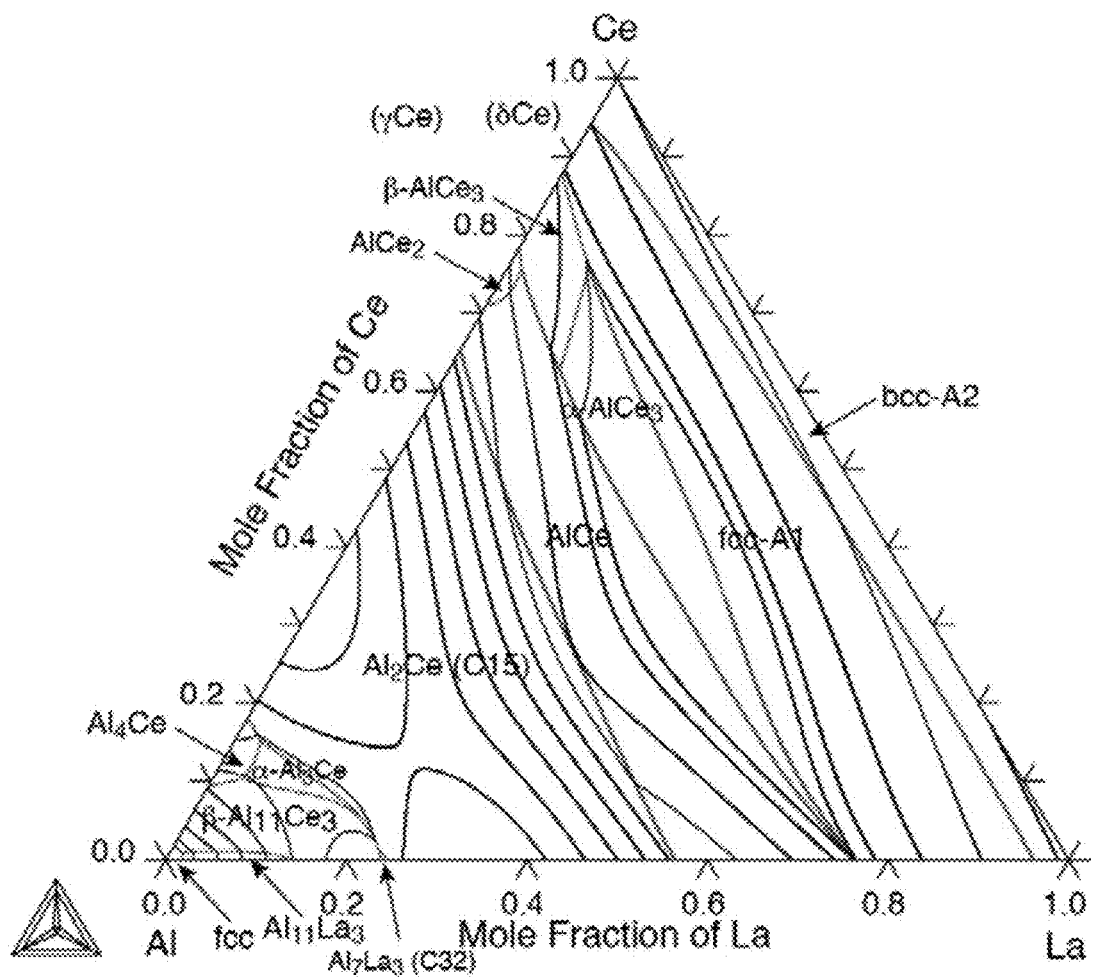

In any of the disclosed embodiments, the rare earth component X may be cerium (Ce), lanthanum (La), mischmetal, or any combination thereof. Ce and La exhibit very similar atomic properties with the same number of valence electrons in the 6s energy orbital. They also exhibit a very similar atomic radius. The Al—Ce and Al—La phase diagrams in the aluminum rich region appear substantially identical with the only discernible difference being the depression in the primary Al$_{11}$La$_3$ liquidus temperature over that of the equivalent Al$_{11}$Ce$_3$ region (FIGS. 1A-1C). Furthermore if one observes the ternary isotherm plotted by the Al—La—Ce system at 500° C. it can be observed that Ce and La form mirrored phase spaces across constant Al isopleth lines. Naturally occurring mischmetal may be a less expensive alternative than pure cerium and/or lanthanum.

In addition to aluminum and the rare earth component X, certain embodiments of the disclosed alloys include other components including, but not limited to, Mg, Si, Fe, Ni, and/or Zn. In an embodiment where the alloy is a ternary alloy, the alloy composition may be represented by "Al-aX-bY" where X is the rare earth component, Y is another metal, and a and b indicate the percentages by weight of the total alloy composition of components X and Y. For instance, Al-8Ce-10Mg indicates an alloy having 8 wt % Ce and 10 wt % Mg, with the balance being aluminum. The compositions of alloys including more than three elements can be written with similar notation. For example, Al-8Ce-4Si-1.5Mg-3Ni includes 8 wt % Ce, 4 wt % Si, 1.5 wt % Mg, and 3 wt % Ni, with the balance being aluminum.

In any of the disclosed embodiments, the alloys may include other elements that are grain refiners and/or do not significantly affect formation and stability of the intermetallic phase. Such elements include, for example, Ti, V, and/or Zr. Moreover, the alloys may contain minor amounts (less than 5 wt %, such as less than 2 wt % or less than 1 wt %, or within industrial constraints or compositional tolerance levels for ASM indexed alloys (e.g., ASM Alloy Phase Diagram Database™ online database (ASM International)) of various impurities that have no substantial effect on the mechanical properties of the alloys, particularly yield strength, compared to a corresponding alloy that does not include the impurities.

In some embodiments, the alloy comprises, consists of, or consists essentially of aluminum and the rare earth component X. "Consists essentially of" means that the alloy does not include additional components that affect the chemical and/or mechanical properties of the alloy by more than 2% relative to a comparable alloy that is devoid of the additional components. For example, the alloy may comprise, consist of, or consist essentially of 4-60 wt %, such as 4-8 wt %, 8-12 wt %, 12-20 wt %, 20-35 wt %, 35-60 wt %, 35-52 wt %, or 5-60 wt % of the rare earth element X, based on the total alloy composition, with the balance being aluminum. In certain embodiments, the alloy comprises, consists of, or consists essentially of 4-45 wt %, 4-35 wt %, 4-20 wt %, 6-18 wt %, 8-16 wt %, or 10-14 wt % of the rare earth component X, based on the total alloy composition, with the balance being aluminum. In certain embodiments, the alloy comprises, consists of, or consists essentially of aluminum, the rare earth component X, and one or more of Mg, Si, Fe, Ni, and Zn. In some examples, the alloy comprises, consists of, or consists essentially of, 4 wt % to 60 wt % Ce, La, mischmetal, or a combination thereof, 0 wt % to 15 wt % Mg, 0 wt % to 12 wt % Si, 0 wt % to 6 wt % Fe, 0 wt % to 5 wt % Ni, and 0 wt % to 6 wt % Zn, with the balance being aluminum. In certain examples, the alloy comprises, consists of, or consists essentially of, 4 wt % to 20 wt % Ce, La, mischmetal, or a combination thereof, 0 wt % to 15 wt % Mg, 0 wt % to 12 wt % Si, 0 wt % to 6 wt % Fe, 0 wt % to 5 wt % Ni, and 0 wt % to 6 wt % Zn, with the balance being aluminum. When the alloy includes mischmetal, the percentages of other components, such as Fe, Si, and Mg, are in addition to the amounts of those components provided by the mischmetal itself. In an independent embodiment, the alloy comprises, consists of, or consists essentially of, 6 wt % to 18 wt % Ce, La, mischmetal, or a combination thereof, 0 wt % to 15 wt % Mg, 0 wt % to 12 wt % Si, 0 wt % to 6 wt % Fe, 0 wt % to 5 wt % Ni, and 0 wt % to 6 wt % Zn, with the balance being aluminum. In another independent embodiment, the alloy comprises, consists of, or consists essentially of, 8 wt % to 16 wt % Ce, La, mischmetal, or a combination thereof, 0 wt % to 15 wt % Mg, 0 wt % to 12 wt % Si, 0 wt % to 6 wt % Fe, 0 wt % to 5 wt % Ni, and 0 wt % to 6 wt % Zn, with the balance being aluminum. In yet another independent embodiment, the alloy comprises, consists of, or consists essentially of, 10 wt % to 14 wt % Ce, La, mischmetal, or a combination thereof, 0 wt % to 15 wt % Mg, 0 wt % to 12 wt % Si, 0 wt % to 6 wt % Fe, 0 wt % to 5 wt % Ni, and 0 wt % to 6 wt % Zn, with the balance being aluminum. In still another independent embodiment, the alloy comprises, consists of, or consists essentially of, 8 wt % to 16 wt % Ce, La, mischmetal, or a combination thereof, 0.1 wt % to 2 wt % Mg, 0.5 wt % to 5 wt % Si, and 0.5 wt % to 5 wt % Ni. In another independent embodiment, the alloy comprises, consists of, or consists essentially of, 8 wt % to 16 wt % Ce, La, mischmetal, or a combination thereof, 0.1 wt % to 5 wt % Mg, and 1 wt % to 10 wt % Si. In yet another independent embodiment, the alloy comprises, consists of, or consists essentially of, 8 wt % to 16 wt % Ce, La, mischmetal, or a combination thereof, 0.1 wt % to 2 wt % Mg, 1 wt % to 10 wt % Si, and 0.5 wt % to 5 wt % Ni. In still another independent embodiment, the alloy comprises, consists of, or consists essentially of, 8 wt % to 16 wt % Ce, La, mischmetal, or a combination thereof, and 1 wt % to 15 wt % Mg. In certain working embodiments, the rare earth component was Ce.

In any of the disclosed embodiments, the surface-hardened alloys may comprise a bulk metallic phase and an intermetallic phase. The bulk metallic phase comprises, consists of, or consists essentially of aluminum (an aluminum matrix), and the intermetallic phase comprises, consists of, or consists essentially of aluminum and the rare earth component X. In some embodiments, the bulk metallic phase may include additional elements that are soluble in the aluminum matrix, e.g., Mg, Si, Zn, etc. Such additional elements also may be present in the intermetallic phase in certain embodiments. Some embodiments of the disclosed alloy comprise, consist of, or consist essentially of from 5 wt % to 30 wt % of the intermetallic phase, such as from 7 wt % to 25 wt % or from 10 wt % to 20 wt % of the intermetallic phase.

When the alloy is a binary alloy of aluminum and the rare earth component X, the intermetallic phase may be an $Al_{11}X_3$ intermetallic phase. When the alloy is a ternary alloy, quaternary alloy, or the like, the intermetallic phase may have a different composition. For example, in an alloy comprising cerium, silicon, and aluminum, the intermetallic phase may include AlCeSi. The intermetallic phase may strengthen the alloy. In some embodiments, from 95 wt % to 100 wt % of the rare earth component X in the alloy is present in the intermetallic phase. For example, in any of the binary alloy embodiments disclosed herein, from 96-100 wt %, 97-100 wt %, 98-100 wt %, 99-100 wt %, 99.5-100 wt %, 99.7-100 wt %, or 99.9-100 wt % of the rare earth component X may be in the intermetallic phase of the alloy. Similarly, in any of the ternary, quaternary (or higher) alloy embodiments disclosed herein, from 96-100 wt %, 97-100 wt %, 98-100 wt %, 99-100 wt %, 99.5-100 wt %, 99.7-100 wt %, or 99.9-100 wt % of the rare earth component X may be in the intermetallic phase of the alloy. Stated another way from 95 wt % to 100 wt %, such as 96-100 wt %, 97-100 wt %, 98-100 wt %, 99-100 wt %, 99.5-100 wt %, 99.7-100 wt %, or 99.9-100 wt % of the rare earth component X in the alloy is excluded from the aluminum matrix or bulk phase. Elements other than the rare earth component X and aluminum may be present in the aluminum matrix, the intermetallic phase, and/or in separate regions within the alloy.

Figure 3:
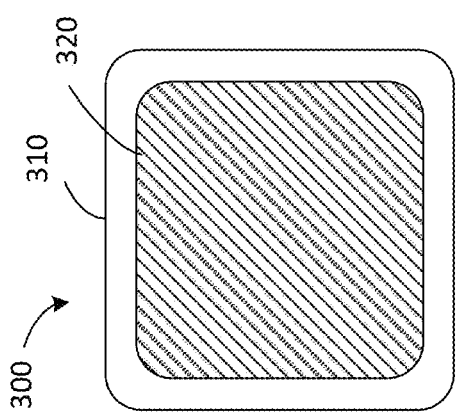
FIG. 3 is a cross-sectional schematic diagram illustrating a surface-hardened alloy component as disclosed herein.

As shown in the cross-sectional view of FIG. 3, certain embodiments of the disclosed surface-hardened alloy components 300 include an alloy bulk portion 310 and a hardened alloy surface portion 320, wherein at least a portion of the hardened alloy surface portion 320 has a Vickers hardness at ambient temperature that is at least 30% greater than a Vickers hardness of the alloy bulk portion 310 at ambient temperature, as measured by ASTM method E384 with a 100-gram load and a duration of 10-15 seconds. As used herein, ambient temperature means a temperature within a range of 20-25° C. In some embodiments, the hardened alloy surface portion has a Vickers hardness at ambient temperature that is at least 35%, at least 40%, at least 45%, or at least 50% greater than the Vickers hardness of the alloy bulk portion at ambient temperature. In any embodiment of the alloys disclosed herein, the Vickers hardness of the hardened alloy surface portion at ambient temperature may be 30-60%, 35-60%, 40-60%, 45-60%, or 50-60% greater than the Vickers hardness of the alloy bulk portion at ambient temperature. In certain embodiments, the hardened alloy surface portion has a Vickers hardness, as measured by ASTM method E384, of 60, such as a Vickers hardness of ≥70, ≥80, ≥90, or even ≥100.

In any of the disclosed embodiments, the hardened alloy surface portion of the surface-hardened alloy component may have an average thickness, as measured from an surface of the alloy to a depth at which the Vickers hardness is that of the alloy bulk portion, of at least 20 μm, such as an average thickness of from 10 μm to 1.5 mm, 20 μm to 1.5 mm, 20 μm to 1 mm, 50 μm to 1 mm, 100 μm to 1 mm, 100 μm to 500 μm, or 200 μm to 500 μm. The thickness of the hardened alloy surface portion may be modified by selecting particular surface hardening conditions as described below.

The hardened alloy surface portion of the surface-hardened alloy component has a surface microstructure comprising surface morphological features. The alloy bulk portion of the surface-hardened alloy component has a bulk microstructure comprising bulk morphological features. A person of ordinary skill in the art of metallurgy will understand that the presence or absence of particular morphological features (e.g., grains, precipitates, cells, dendrites, lamellae, eutectic microconstitutents, etc.) may depend on and be commensurate with the solidification history of the alloy, e.g., the rate of solidification. In any of the embodiments disclosed herein, the surface morphological features and the bulk morphological features may include aluminum matrix regions (cells) and features (e.g., lamellae and/or dendrites) comprising the intermetallic phase, in addition to other phases resulting from additional alloying elements.

In any of the disclosed embodiments, the surface and bulk microstructures also may include a eutectic microconstituent, which may comprise at least 10 volume percent of the microstructures, such as at least 20 volume percent of the microstructures. A eutectic microconstituent is a feature of the microstructure having a distinctive lamellar or rod structure consisting on two or more phases that form through coupled growth from the liquid phase. The eutectic constituent forms through an isothermal invariant reaction involving the co-precipitation and growth of two or more phases with a distinct composition. Exemplary phases may include the FCC Al phase with space group FM-3M and the orthorhombic $Al_{11}X_3$ phase with space group IMMM. If other components (e.g., Si, Ni) are present, other phases may be present, for example, body-centered tetragonal XAlSi phase with space group I41MD, the primitive cubic phase NiAl with space group PM-3M, and/or the face centered Si phase with the Fd-3m space group.

In any of the embodiments disclosed herein, the morphological features of the surface and alloy bulk portions may be quantified by average thickness, average spacing between features, and/or average cross-section, such as average diameter of a cross-section taken across the narrowest dimension of the features. Quantification may be performed by any suitable method, such as by obtaining an SEM or optical micrograph of the alloy and evaluating the sizes of the morphological features in the image. In some embodiments, the bulk morphological features have (i) an average thickness at least 2-fold greater than an average thickness of corresponding surface morphological features, (ii) an average spacing at least 2-fold greater than an average spacing of the corresponding surface morphological features, (iii) an average cross-section in a narrow dimension at least 2-fold greater than an average cross-section in a narrow dimension of the corresponding surface morphological features, or (iv) any combination of (i), (ii), and (iii). By "corresponding surface morphological features" is meant features having similar morphology, e.g., cells, dendrites, lamellae, rods, laths, etc. For example, dendrites and/or lamellae in the alloy bulk portion may have an average thickness at least 2-fold greater than the average thickness of dendrites and/or lamellae in the hardened alloy surface portion. In certain embodiments, the average thickness, spacing, and/or cross-section of the bulk morphological features is at least 5-fold greater, at least 10-fold greater, at least 25-fold greater, at least 50-fold greater, or at least 100-fold greater than the morphological features of the hardened alloy surface portion of the hardened-surface alloy component. Alternatively, it can be said that the hardened alloy surface portion morphological features are at least 2×, at least 5×, at least 10×, at least 25×, at least 50×, or even at least 100× finer than the alloy bulk portion morphological features. In general, mechanical properties such as tensile strength and fracture toughness of metallic alloys improve as the microstructure is refined to reduce the size of microstructural morphological features.

Thus, surface-hardening provides the outer surface portion with morphological features that are much finer than the morphological features of the alloy bulk portion of the alloy component. In any of the disclosed embodiments, the surface morphological features may have a cross-section in a narrow dimension with an average diameter of ≤500 nm, ≤400 nm, ≤300 nm, ≤200, ≤100 nm, ≤50 nm, ≤25 nm, or ≤10 nm, such as an average diameter of 2-500 nm, 5-500 nm, 10-500 nm 10-400 nm, 10-300 nm, 10-200 nm, 10-100 nm, ≤50 nm, or 10-25 nm.

Some embodiments of the disclosed alloy components exhibit exceptional thermal stability. Exceptional thermal stability is evidenced by resistance of the morphological features of the hardened surface portion and, in some embodiments, the bulk portion to coarsening. For example, the average thickness of the surface morphological features, the average spacing of the surface morphological features, the average cross section of the surface morphological features, or any combination thereof, may increase by less than 100%, less than 50%, less than 20%, less than 15%, less than 10%, or less than 5% after subjecting the surface-hardened alloy component to a temperature of 300° C. for 24 hours. In some embodiments, coarsening of less than 100% (as evidenced by increased thickness, spacing, cross-section of morphological features), such as coarsening of less than 50%, less than 40%, less than 30%, or less than 20% occurs when the alloy component is exposed to a temperature of 300° C. for 1,000 hours. Without wishing to be bound by a particular theory of operation, the resistance to coarsening is attributed to the low solid solubility of the rare earth component X in the aluminum bulk phase. In certain embodiments, the disclosed alloys also exhibit excellent castability and resistance to hot tearing.

Alloys without a rare earth component X, such as Al/Mg and/or Al/Si alloys, typically exhibit coarsening with concomitant reduction in surface hardness when exposed to high temperatures, such as temperatures at or above 250° C. Such coarsening is due at least in part to diffusion of the minor component, e.g., Mg, into the aluminum at higher temperatures, both decreasing the volume percent of the intermetallic in the alloy and allowing the intermetallic to coarsen via movement of the minor component through the aluminum bulk phase. In contrast, however, some embodiments of the disclosed alloys exhibit little or no diffusion of the rare component X into the bulk regions of aluminum when exposed to high temperatures.

Some embodiments of the disclosed surface-hardened alloy components are suitable for use in high-temperature and/or weight-critical applications, such as in the automotive and aerospace industries. Advantageously, the surface-hardened alloy components have a high surface hardness as discussed above, while maintaining ductility in the alloy bulk portion. In some embodiments, the high surface hardness leads to improved tribological properties, such as wear resistance, compared to an alloy component of the same chemical composition that does not have a hardened surface portion.

Another advantage of some embodiments of the disclosed alloy components is that the hardened surface portion has the same chemical composition as the alloy bulk portion of the alloy component. In contrast, other processes such as carburizing of steel or nitriding alloys modify the surface chemistry to obtain desirable properties.

III. Methods of Making Surface-Hardened Alloy Components

In some embodiments, an alloy is prepared by heating aluminum to a temperature above its melting point, such as to a temperature of at least 100° C. above its melting point. The aluminum may be heated in an atmosphere without oxygen. After the aluminum is in a fully liquid state, a rare earth component X is added. In certain embodiments, the rare earth component X is added in the form of ingots to the aluminum melt. After the rare earth component has melted completely, a degassing step may be taken to remove oxides and/or oxygen that may be present in the melt. In certain embodiments, all or substantially all (e.g., at least 95%) oxides and/or oxygen are removed. The molten alloy may then be cast into a vessel and allowed to solidify. When the alloy includes elements other than aluminum and the rare earth component X, the additional elements may be melted with the aluminum or added to the aluminum melt prior to or after adding the rare earth component X.

In some embodiments, a prefabricated alloy component is prepared by casting the alloy into a mold corresponding to the shape of the alloy component. Alternatively, a prefabricated alloy component can be formed by any other suitable method. For example, the alloy component may be formed by forging, extruding, machining (e.g., milling, shaping, shaving, grinding, honing, lapping), or stamping the alloy. Although the method of prefabricating the alloy component may influence the initial microstructure of the alloy, the surface-hardening process will nonetheless produce a surface microstructure that is much finer than the bulk microstructure, e.g., at least 2×, at least 5×, at least 10×, at least 25×, at least 50×, or even at least 100× finer than the alloy bulk portion morphological features At least a portion of an alloy surface of the prefabricated alloy component is then hardened to form a surface-hardened alloy component. In some embodiments, hardening at least a portion of the alloy surface of the prefabricated alloy component comprises melting the portion of the alloy surface and allowing the melted alloy surface to cool and solidify, thereby forming a surface-hardened alloy component having an alloy bulk portion and a hardened alloy surface portion, at least a portion of the hardened alloy surface portion having a Vickers hardness at ambient temperature that is at least 30% greater than a Vickers hardness of the alloy bulk portion at ambient temperature, as measured by ASTM method E384. Advantageously, surface hardening is performed by a process that results in rapid melting and solidification, thereby refining the microstructure to produce smaller morphological features than those present in the alloy bulk portion of the alloy component. Desirably, the process provides a hardened surface substantially without voids and/or cracks.

In some embodiments, melting the alloy surface comprises using a laser having a sufficient power to melt a portion of the alloy surface of the prefabricated alloy component exposed to the laser at a rate sufficient to provide melting before thermal conduction removes the heat. In one embodiment, using a laser includes moving the laser across the alloy surface at a rate sufficient to melt a portion of the alloy surface exposed to the laser. Alternatively, the prefabricated alloy component may be moved relative to a stationary laser. In certain embodiments, the laser is moved across the alloy surface (or the alloy surface is moved relative to the laser) at a rate sufficient to melt the portion of the alloy surface to an average thickness of from 10 μm to 1.5 mm. Advantageously, laser melting can be performed in air, significantly reducing the cost of manufacturing compared to other methods such as carburization or similar practices.

Figure 2:
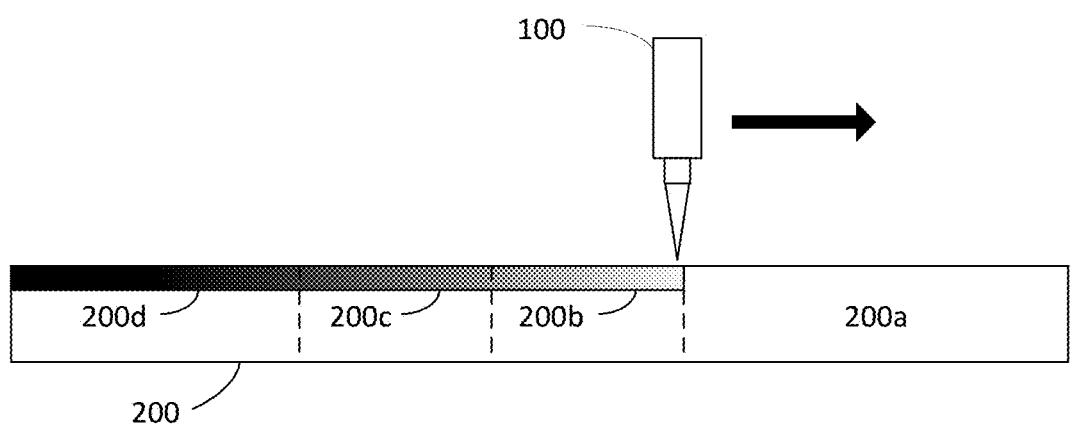
FIG. 2 is a schematic diagram illustrating one embodiment of the surface-hardening process as disclosed herein.

FIG. 2 is a schematic diagram showing movement of a laser 100 across an alloy surface of an alloy component 200. As the laser 100 moves across the alloy surface of the alloy component 200, untreated regions (e.g., 200a) are exposed to the laser 100 and are melted to form a melted region 200b. As the laser continues to move, the melted region begins to solidify (region 200c) and forms a surface-hardened region 200d.

The laser may be any laser having sufficient power to melt the alloy from which the prefabricated alloy component is made. Lasers emitting visible, near-infrared, or infrared light may be suitable. In certain examples, a laser system from DM3D Technology, LLC (Auburn Hills, Mich.) was used.

In any of the disclosed embodiments, the laser power and rate of movement may be selected to provide a desired melting depth and/or to provide a desired molten spot size. In some embodiments, the laser has a power of at least 100 W, such as a power of from 100 W to 50 kW, 200 W to 50 kW, 300 W to 50 kW, 400 W to 50 kW, 500 W to 50 kW, 500 W to 25 kW, 500 W to 10 kW, or 500 W to 1 kW. The rate of movement of the laser across the alloy surface of the alloy component may be within a range of from 100 mm/minute to 5 m/second, such as a range of from 200 mm/min to 5 m/s, 300 mm/min to 5 m/s, 400 mm/min to 5 m/s, or 400 mm/min to 2.5 m/s. In some embodiments, there is a direct correlation between the laser power and the laser rate of movement. For example, as the power of the laser is increased, the rate of movement is also increased. In certain embodiments, the laser power and rate of movement are selected to provide a molten spot size having an average diameter of from 100 μm to 15 mm in the portion of the alloy surface of the alloy component exposed to the laser.

In certain embodiments, melting the portion of the alloy surface is performed with an electron beam having a sufficient power to melt a portion of the alloy surface of the prefabricated alloy component exposed to the laser at a rate sufficient to provide melting before thermal conduction removes the heat. Surface-hardening with an electron beam typically is performed under vacuum conditions. In one embodiment, using an electron beam includes moving the electron beam across the alloy surface at a rate sufficient to melt a portion of the alloy surface exposed to the electron beam. Alternatively, the prefabricated alloy component may be moved relative to a stationary electron beam. The accelerating voltage, beam current, beam size, and rate of movement may be selected to provide a desired melting depth and/or to provide a desired molten spot size as described above.

An alloy component can be surface hardened by rastering either the laser (or electron beam) or the alloy component itself. In one embodiment, the laser or electron beam is moved across the alloy surface in substantially parallel, non-overlapping "tracks" such that each area of the alloy surface is exposed to the laser or electron beam and melted only once. In an independent embodiment, the laser or electron beam is moved across the alloy surface in substantially parallel, overlapping tracks such that each eater of the alloy surface is exposed to the laser or electron beam and melted more than once. In another independent embodiment, the alloy component itself is rastered such that overlapping or non-overlapping portions of the alloy surface are exposed to a non-moving laser or electron beam. In yet another independent embodiment, at least a portion the alloy surface is exposed to the laser or electron beam and melted a plurality of times. In certain examples, melting and resolidifying the surface portion two or more times may produce a greater increase in hardness and/or a greater refinement of surface portion morphological features compared to a surface portion that has been melted and resolidified only once.

In some embodiments, melting the portion of the alloy surface is performed by electromagnetic induction. In a high frequency (>100 kHz) and high power (>10 kW) system, electrical currents can be induced locally in the surface, providing resistive heating and melting. The penetration depth of these currents is called the skin depth, controlled by material resistivity, magnetic permeability, and the frequency of induction. Power is provided by an induction coil, such as a water-cooled copper coil, through which high current alternating current is passed. The geometry of the induction coils can be selected to suit specific desired geometries. For instance, a tube could be treated by a circumscribing helical coil, where a flat plate could be treated by a circular coil. In this manner, a large area could be treated by rastering either the work part or the coil.

In one embodiment, a method of making a cast alloy component may include steps of:
  a. heating preselected amounts of aluminum, and optionally at least one additional alloying element (e.g., Mg, Si, Fe, Ni, and/or Zn), to a molten state to form a melt;
  b. degassing (e.g., rotary degassing) the melt with a reactive gas (e.g., nitrous oxide) in order to purge the melt of undesirable dissolved materials and bring the melt to greater than 90% theoretical density;
  c. optionally further degassing the melt with a nonreactive gas to remove the reactive gas;
  d. fluxing the melt with an alkaline-based flux (suitable alkaline-based fluxes are commercially available) to remove dissolved gases and undesirable solids;
  e. testing theoretical density of the melt, and if the theoretical density:
    (i). does not exceed 70% theoretical density, repeat steps b, c, d, and e;
    (ii). exceeds 70% theoretical density, but does not exceed 90% theoretical density, repeat steps c, d, and e;
    (iii). exceeds 90% theoretical density, go to step f;
  f. adding to the melt a preselected amount of the rare earth component X (for example, at least one material selected from the group consisting of cerium, lanthanum, and mischmetal);
  g. degassing the melt with a nonreactive gas (e.g., argon or nitrogen);
  h. fluxing the melt with an alkaline-based flux to remove dissolved gases and undesirable solids;
  i. testing theoretical density of the melt, and if the theoretical density:
    (i). does not exceed 90% theoretical density, repeat steps g, h, and i;
    (ii). exceeds 90% theoretical density, go to step j; and
  j. transferring the melt into a casting mold to form a cast alloy.

In an independent embodiment, a method of making a cast alloy component may include steps of:
  a. heating a predetermined amount of aluminum;
  b. degassing the melt with a reactive gas in order to purge the melt of undesirable dissolved materials;
  c. further degassing the melt with a nonreactive gas to remove the reactive gas;
  d. testing theoretical density of the melt, and if the theoretical density:
    (i). does not exceed 70% theoretical density, repeat steps c and d;
    (ii). exceeds 70% theoretical density, but does not exceed 90% theoretical density, repeat steps b, c, and d;
    (iii). exceeds 90% theoretical density, go to step f;

e. adding to the melt a predetermined amount of a rare earth component X;
f. degassing the melt with a nonreactive gas;
g. fluxing the melt with an alkaline-based flux to remove dissolved gases and undesirable solids;
h. testing theoretical density of the melt, and if the theoretical density:
   (i). does not exceed 90% theoretical density, repeat steps f, g, and h;
   (ii). exceeds 90% theoretical density, go to step j;
i. adding a predetermined amount of at least one additional alloying element selected from the group consisting of Si, Mg, Fe, Ni, and/or Zn to the melt;
j. degassing the melt with a nonreactive gas;
k. fluxing the melt with an alkaline-based flux to remove dissolved gases and undesirable solids;
l. testing theoretical density of the melt, and if the theoretical density:
   (i). does not exceed 90% theoretical density, repeat steps j, k and l;
   (ii). exceeds 90% theoretical density, go to step n; and
m. transferring the melt into a casting mold to form a cast alloy.

In another independent embodiment, a method of making a cast alloy component may include steps of:
a. heating predetermined amounts of aluminum and optionally at least one additional alloying element selected from the group consisting of silicon, iron, titanium, zirconium, vanadium, copper, and nickel to a molten state to form a melt;
b. degassing the melt with a reactive gas in order to purge the melt of undesirable dissolved materials;
c. fluxing the melt with an alkaline-based flux to remove dissolved gases and undesirable solids;
d. testing theoretical density of the melt, and if the theoretical density:
   (i). does not exceed 90% theoretical density, repeat steps b, c, and d;
   (ii). exceeds 90% theoretical density, go to step e;
e. adding to the melt a predetermined amount of at least one material selected from the group consisting of magnesium and zinc;
f. degassing the melt with a reactive gas in order to purge the melt of undesirable dissolved materials;
g. further degassing the melt with a nonreactive gas to remove the reactive gas;
h. fluxing the melt with an alkaline-based flux to remove dissolved gases and undesirable solids;
i. testing theoretical density of the melt, and if the theoretical density:
   (i). does not exceed 70% theoretical density, repeat steps f, g, h, and i;
   (ii). exceeds 70% theoretical density, but does not exceed 90% theoretical density, repeat steps g, h, and j;
   (iii). exceeds 90% theoretical density, go to step k;
j. adding to the melt a predetermined amount of at least one material selected from the group consisting of cerium, lanthanum, and mischmetal;
k. degassing the melt with a nonreactive gas;
l. fluxing the melt with an alkaline-based flux to remove dissolved gases and undesirable solids;
m. testing theoretical density of the melt, and if the theoretical density:
   (i). does not exceed 90% theoretical density, repeat steps k, l and m;
   (ii). exceeds 90% theoretical density, go to step o; and
n. transferring the melt into a casting mold to form a cast alloy.

Additional embodiments of methods for casting embodiments of the disclosed alloys are found, for example, in WO 2017/007908, which is incorporated in its entirety herein by reference.

IV. Examples

Alloy components comprising 8 wt % Ce, Al-8Ce, or 12 wt % Ce, Al-12Ce, were prepared as follows. Aluminum ingots were melted in a resistive furnace under and oxygen excluded environment and brought to a temperature above 750° C. Once the temperature in the crucible was stable ingots of cerium were added and mixed until melted. Once melted the alloy was degassed and mixed further. After the temperature in the crucible again stabilized above 750° C., the melt was poured into a mold and allowed to solidify to form a cast alloy component. After the cast alloy components were removed from the mold portions of the casting were machined to create test samples. The machining process produced a surface finish unlike a cast surface and much higher in reflectivity. To reduce reflectivity, the samples were grit blasted. After grit blasting, portions of the alloy surface were hardened using laser remelting and solidification.

Figure 4:
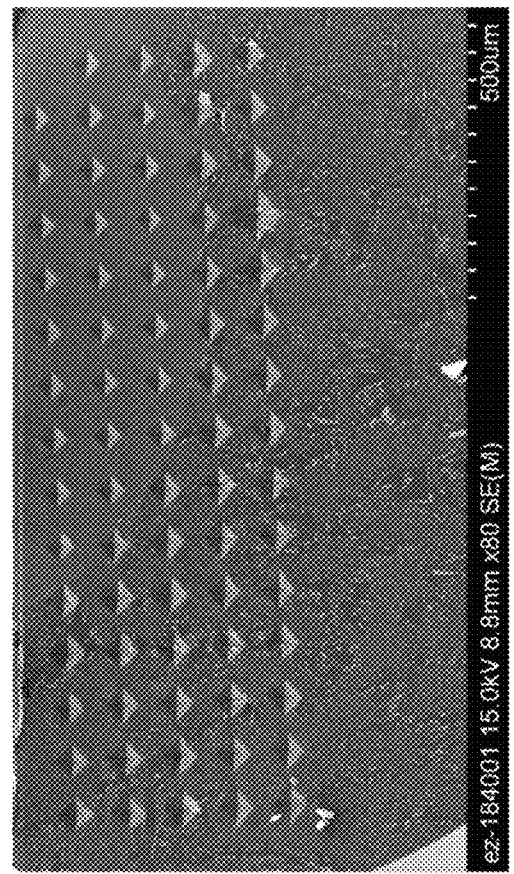
FIG. 4 is an SEM micrograph of a surface-hardened Al-12Ce alloy component showing the locations of the hardness indents relative to the weld region in the upper right portion of the micrograph.
Figure 5:
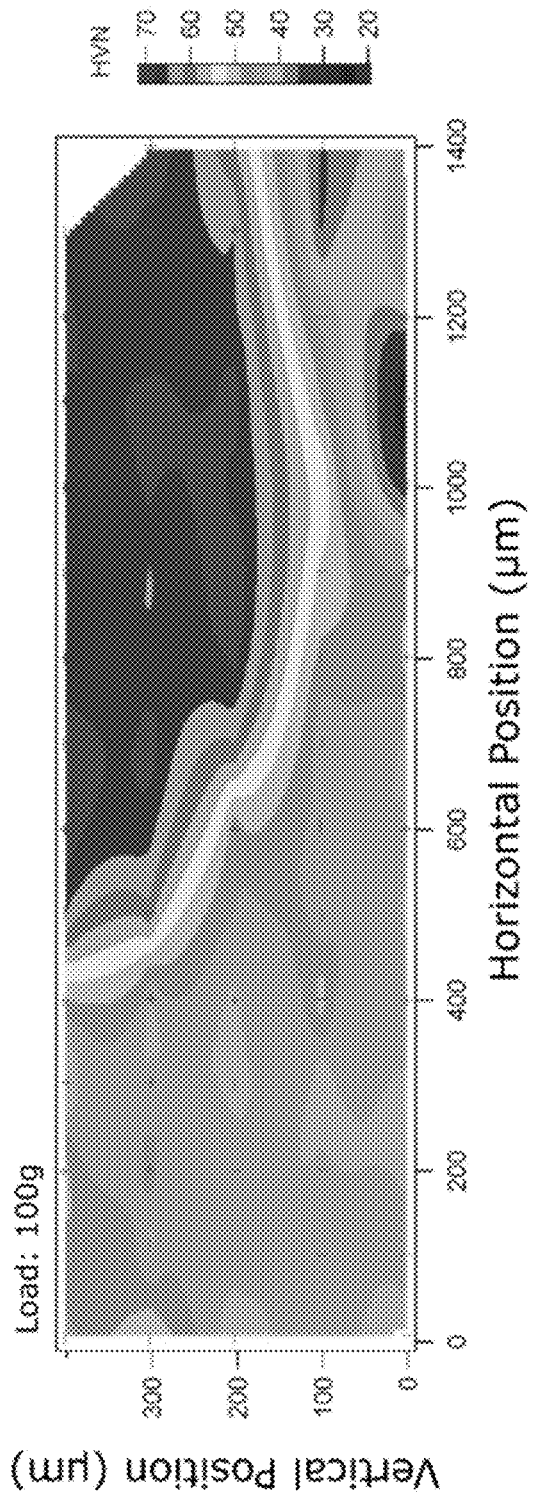
FIG. 5 is a color image of a Vickers hardness map of the surface-hardened Al-12Ce alloy component of FIG. 4, showing the hardness differences between the cast microstructure and the subsequently laser-melted microstructure.
Figure 6:
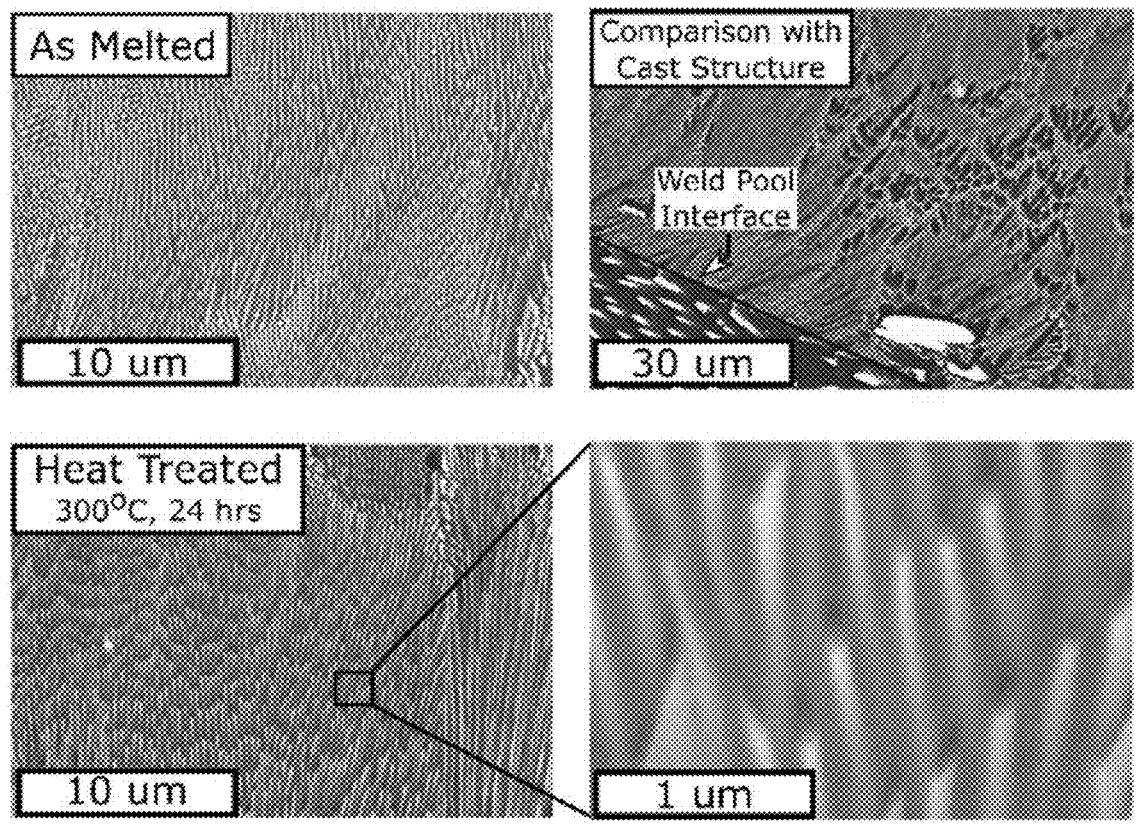
FIG. 6 is four SEM micrographs showing the laser-melted and resolidified surface microstructure (upper left image), the interface of the laser-melted surface microstructure and bulk microstructure (upper right image), and the surface microstructure after heat treatment at 300° C. for 24 hours (lower images) of an Al-12Ce alloy with surface hardening by an 800 W laser having a movement rate of 300 mm/minute.

A portion of the alloy surface of the Al-12Ce alloy component was hardened as disclosed herein using a laser power of 800 W and a rate of movement of 300 mm/min, thereby forming a "weld region" or "melt region" of melted and resolidified alloy. The Vickers hardness of the surface was determined using ASTM method E384 with a 100-gram load and a duration of 10-15 seconds. FIG. 4 is an SEM micrograph of the surface-hardened alloy component showing the locations of the hardness indents relative to the weld region in the upper right portion of the micrograph. FIG. 5 is a color image of a Vickers hardness map of the surface-hardened Al-12Ce alloy component, showing the hardness differences between the cast microstructure and the subsequently laser-melted microstructure. As seen in FIG. 6, the hardness of the laser-melted and resolidified microstructure ranged from approximately 60-70 HV, whereas the hardness of the as-cast alloy ranged from about 20-50 HV. SEM micrographs of the laser-melted surface microstructure (upper left image), the interface of the laser-melted surface microstructure and bulk microstructure (upper right image), and the surface microstructure after heat treatment at 300° C. for 24 hours (lower images) are shown in FIG. 6. Little or no coarsening of the surface portion morphological features was seen.

Figure 7:
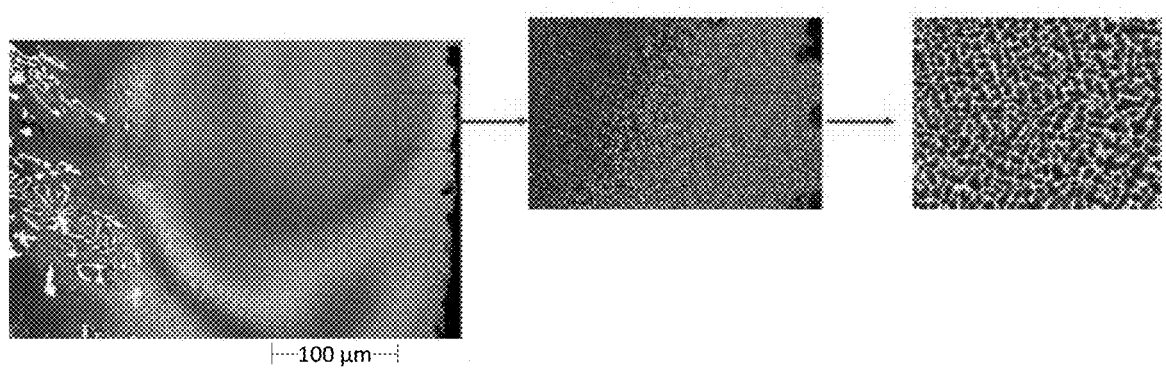
FIG. 7 is three SEM micrographs showing the laser-melted and resolidified surface microstructure of an Al-8Ce-10Mg alloy.

An alloy component comprising 8 wt % Ce and 10 wt % Mg, with the balance being aluminum, was prepared as disclosed herein. FIG. 7 shows SEM micrographs of the Al-8Ce-10Mg alloy component following surface-hardening using a 500 W laser at a movement rate of 2400 mm/minute.

Figure 8:
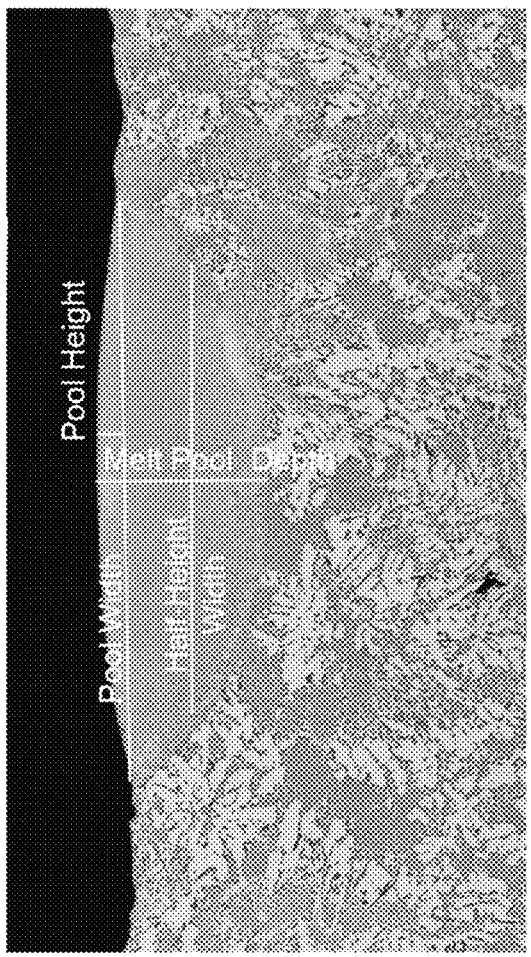
FIG. 8 is an SEM micrograph showing an exemplary melt region on a surface-hardened Al-8Ce alloy component and the measurements used to evaluate the melt region.
Figure 9A:
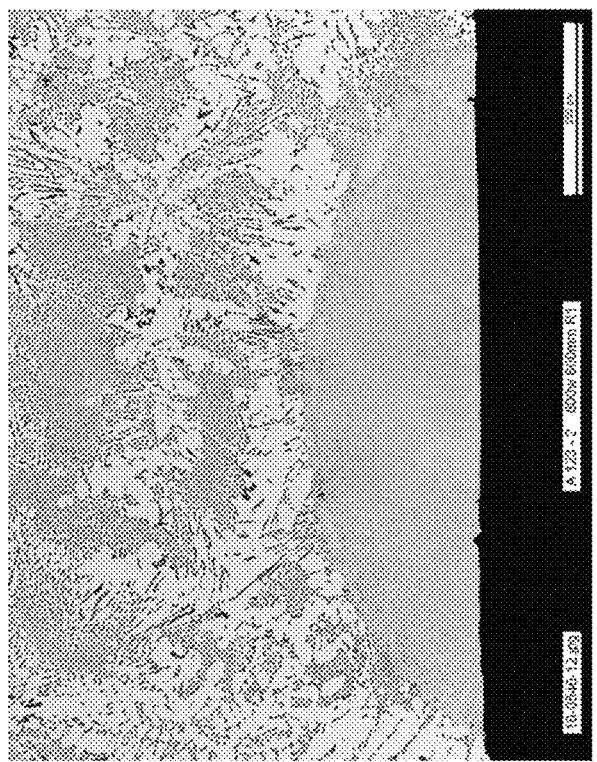
FIGS. 9A-9C are an optical micrograph of an exemplary melt region on a surface-hardened Al-8Ce alloy (9A), an SEM micrograph of the eutectic Al—Al$_{11}$Ce$_3$ structure near the edge of the weld (9B), and a high-magnification SEM micrograph of the eutectic Al—Al$_{11}$Ce$_3$ structure (9C); the melt region was obtained with an 800 W laser at a rate of 400 mm/minute.
Figure 9B:
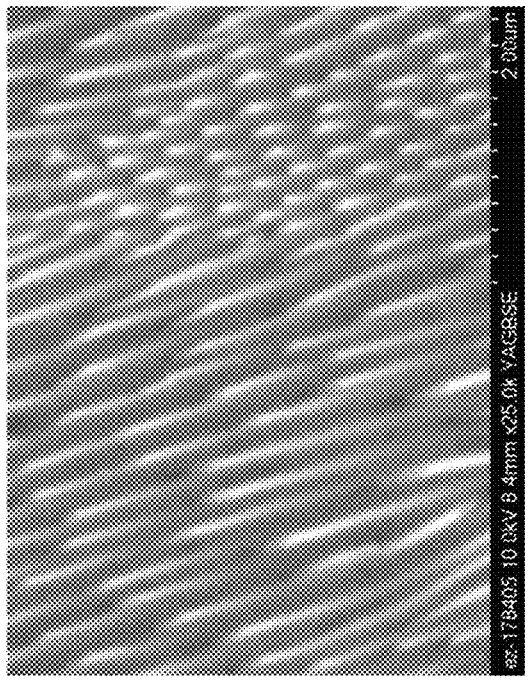
Figure 9C:
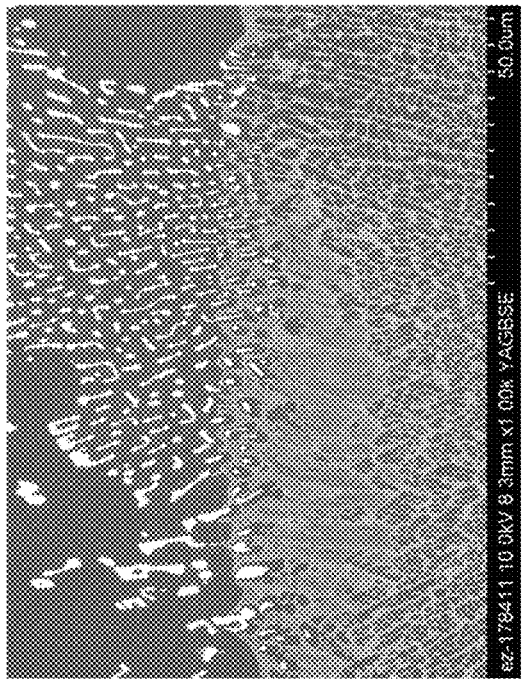
Figure 10A:
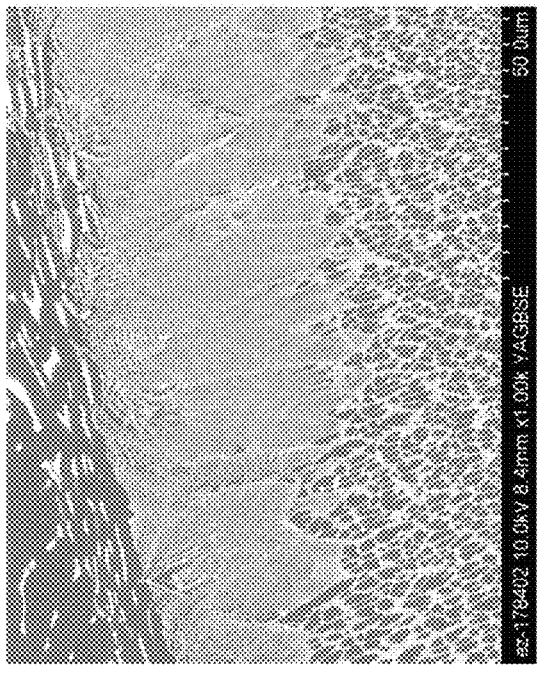
FIGS. 10A-10D are an optical micrograph of an exemplary melt region on a surface-hardened Al-8Ce alloy (10A), an SEM micrograph showing the size difference between the bulk and surface microstructures (10B), an SEM micrograph of dendritic structure near the center of the melt region (10C), and an SEM micrograph showing the small spacing in the eutectic Al—Al$_{11}$Ce$_3$ structure (10D); the melt region was obtained with an 800 W laser at a rate of 600 mm/minute.
Figure 10B:
Figure 10D:
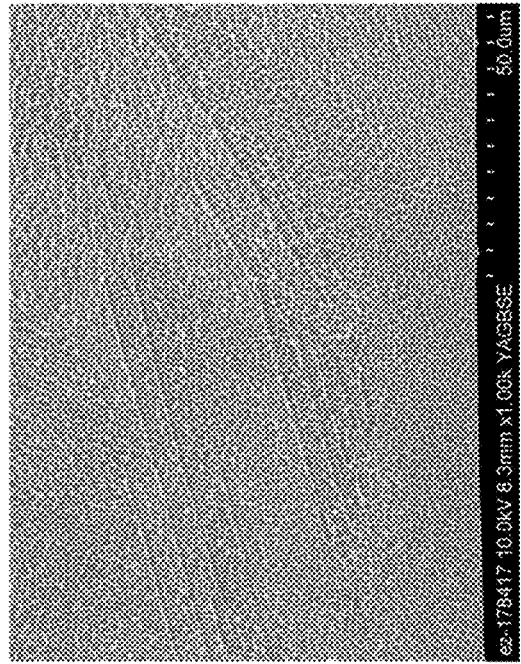
Figure 11B:
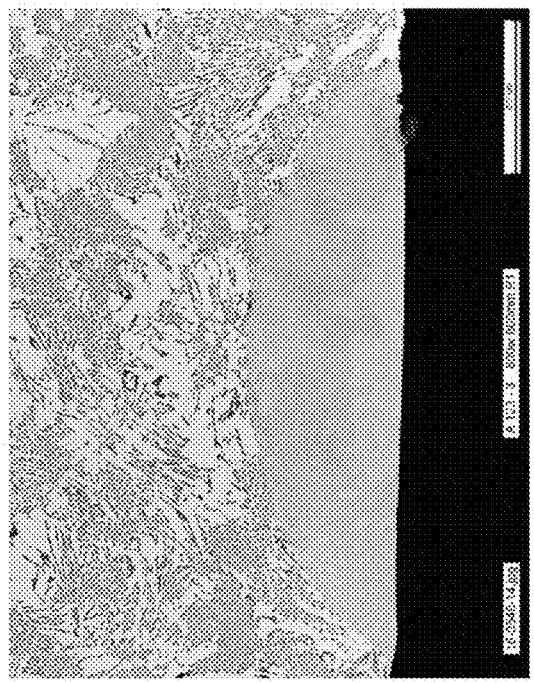
FIGS. 11A-11E are an optical micrograph of an exemplary melt region on a surface-hardened Al-8Ce alloy (11A), an SEM micrograph showing banded microstructure near the center of the melt region (11B), an SEM micrograph of one of the bands near the center of the melt region (11C), an SEM micrograph showing the dendritic structure in the melt region (11D), and an SEM micrograph of unmelted intermetallic particles from the bulk microstructure near the edge of the melt region (11E); the melt region was obtained with an 800 W laser at a rate of 800 mm/minute.
Figure 10C:
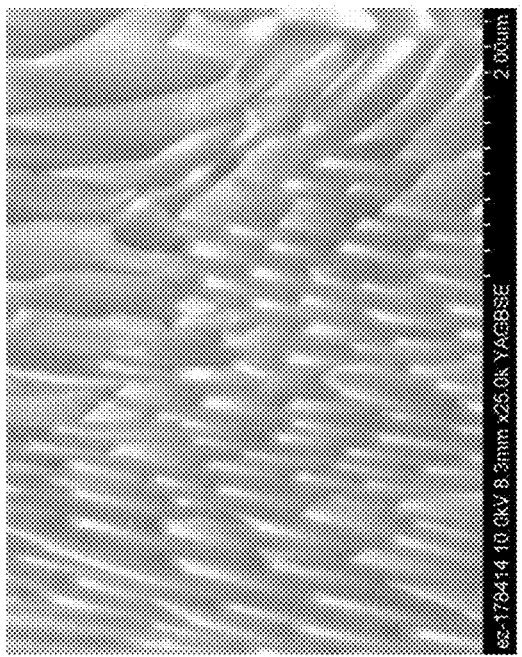
Figure 11A:
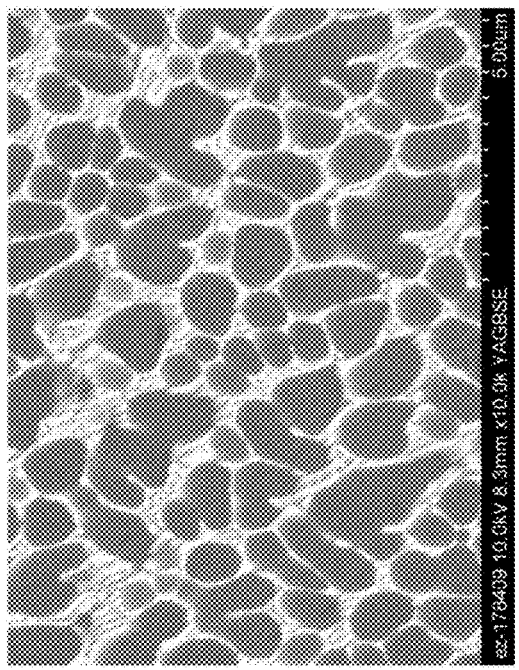
Figure 11D:
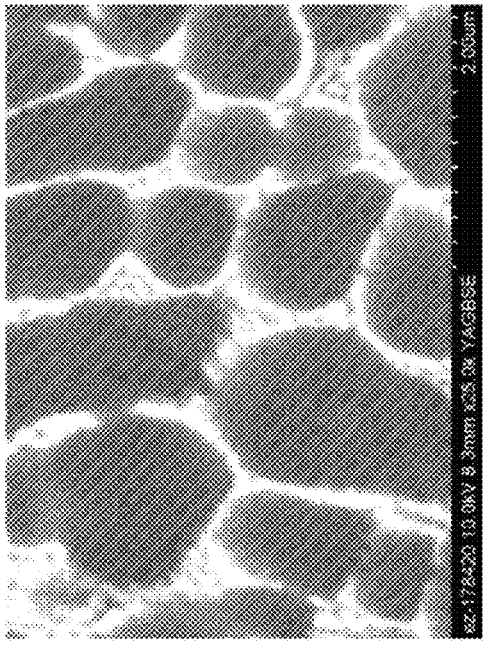
Figure 12:
FIG. 12 is an optical micrograph of an exemplary melt region on a surface-hardened Al-8Ce alloy obtained with a 600 W laser at a rate of 400 mm/minute.
Figure 11C:
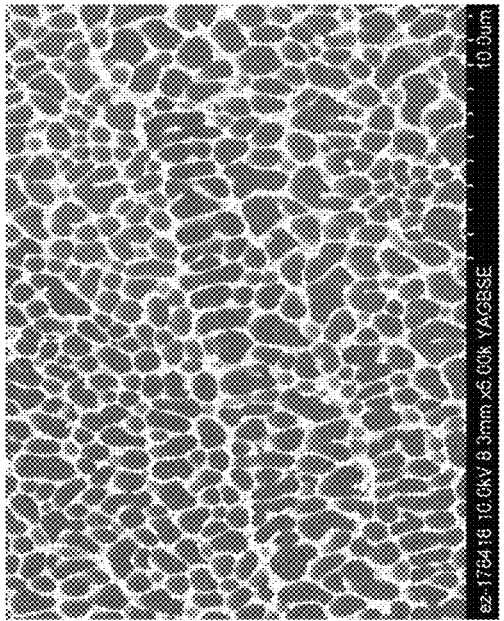
Figure 11E:
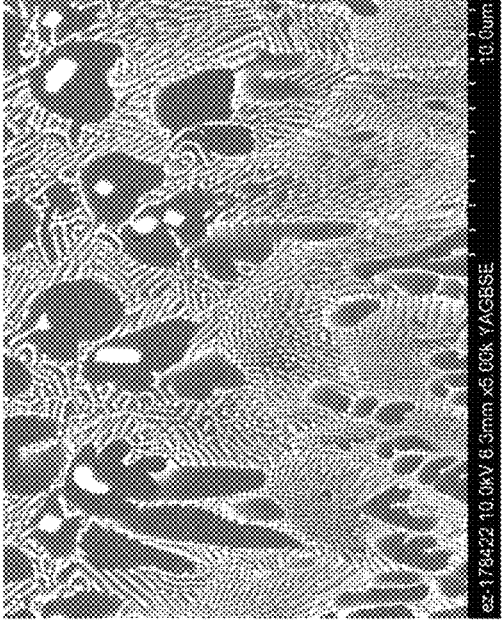
Figure 13:
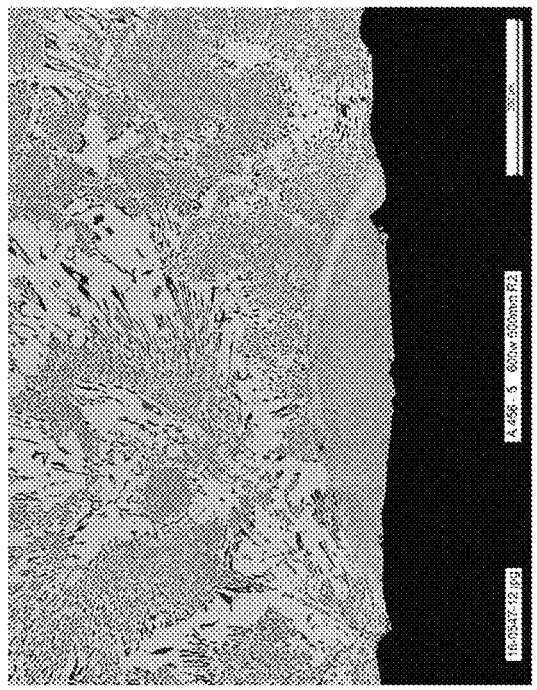
FIG. 13 is an optical micrograph of an exemplary melt region on a surface-hardened Al-8Ce alloy obtained with a 600 W laser at a rate of 600 mm/minute.
Figure 14:
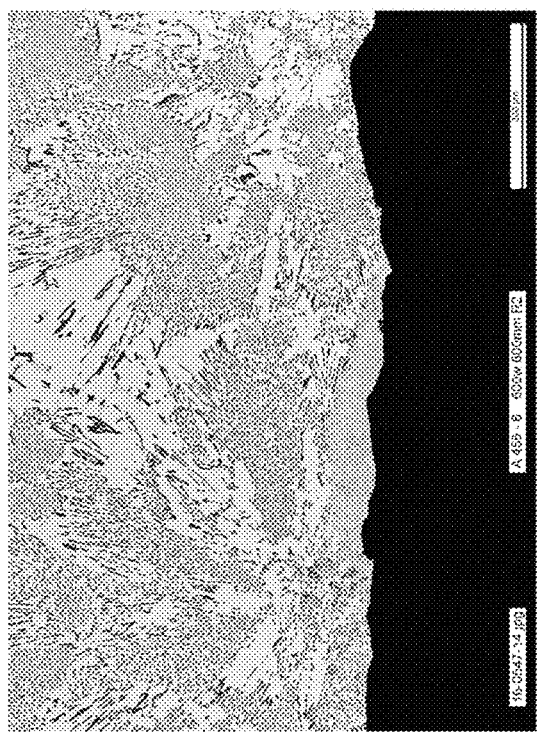
FIG. 14 is an optical micrograph of an exemplary melt region on a surface-hardened Al-8Ce alloy obtained with a 600 W laser at a rate of 800 mm/minute.
Figure 15A:
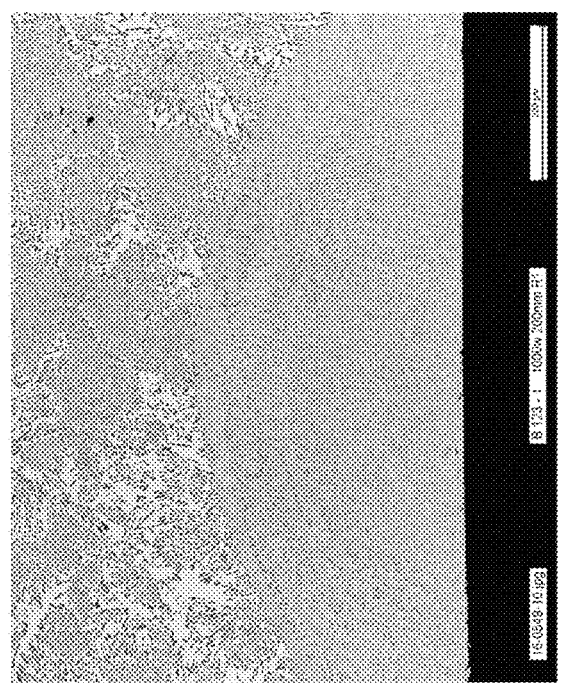
FIGS. 15A-15D are an optical micrograph of an exemplary melt region on a surface-hardened Al-12Ce alloy (15A), an SEM micrograph at the edge of the laser-melted region showing no heat-affected zone in the alloy bulk portion (15B), an SEM micrograph of the edge of the laser-melted region (15C), and an SEM micrograph showing fine eutectic structure in the laser-melted region (15D); the melt region was obtained with a 1000 W laser at a rate of 200 mm/minute.
Figure 15B:
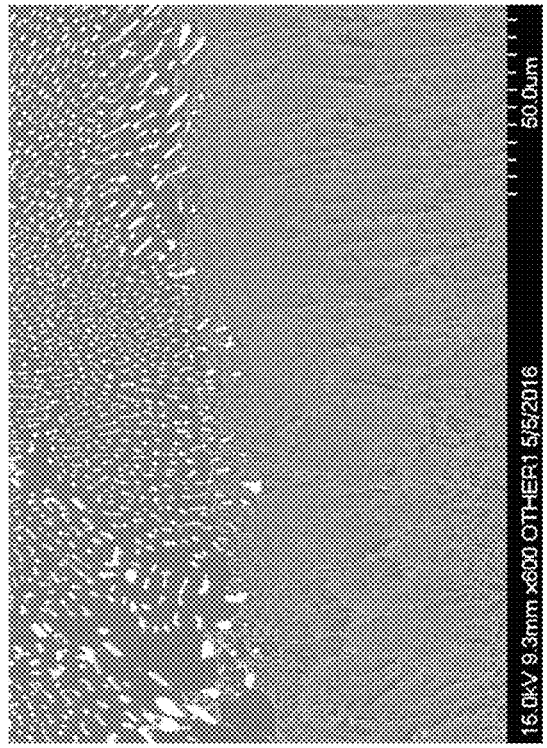
Figure 15C:
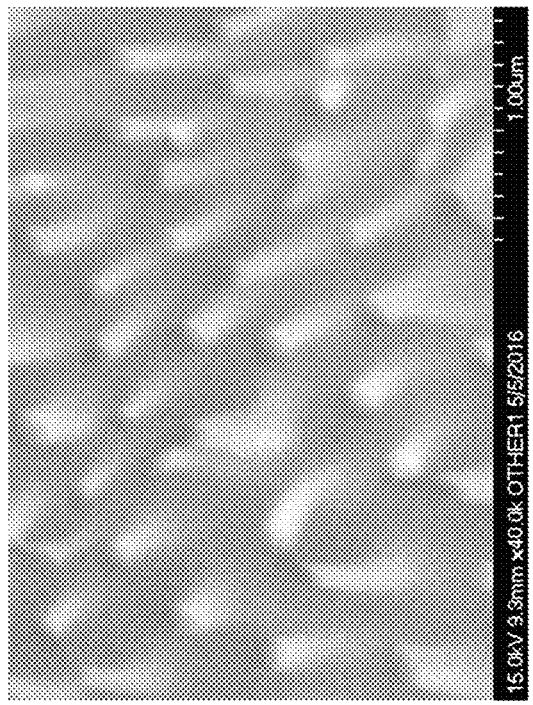
Figure 15D:
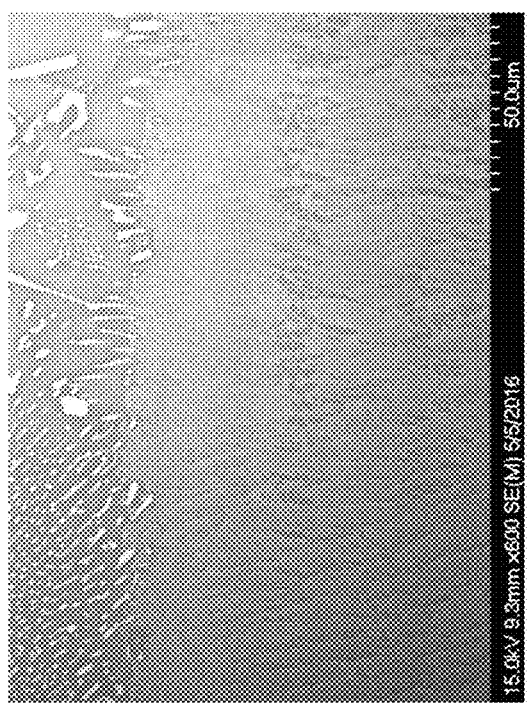
Figure 16:
FIG. 16 is an optical micrograph of an exemplary melt region on a surface-hardened Al-12Ce alloy obtained with a 1000 W laser at a rate of 500 mm/minute.
Figure 17:
FIG. 17 is an optical micrograph of an exemplary melt region on a surface-hardened Al-12Ce alloy obtained with a 1000 W laser at a rate of 800 mm/minute.
Figure 19:
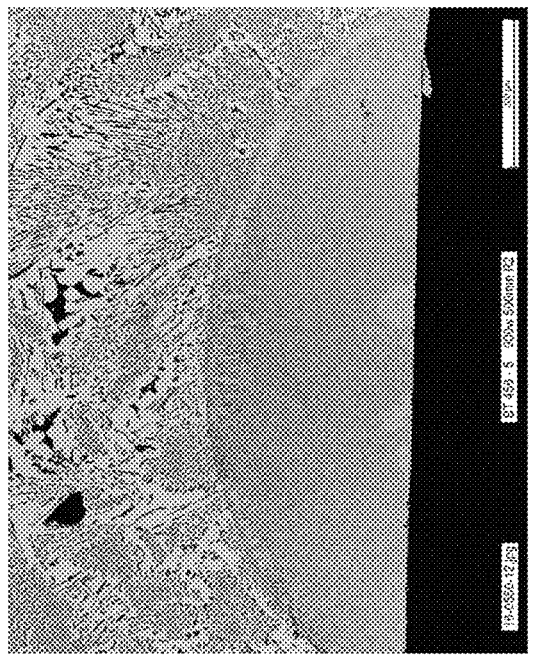
FIG. 19 is an optical micrograph of an exemplary melt region on a surface-hardened Al-12Ce alloy obtained with a 900 W laser at a rate of 500 mm/minute.
Figure 21A:
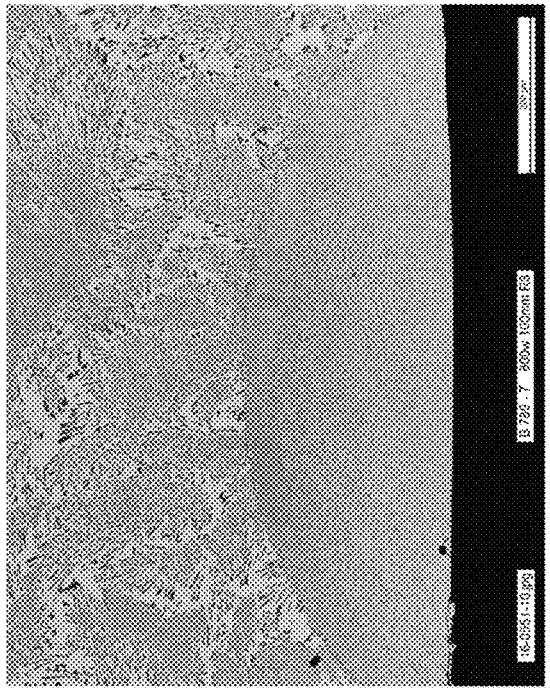
Figure 18:
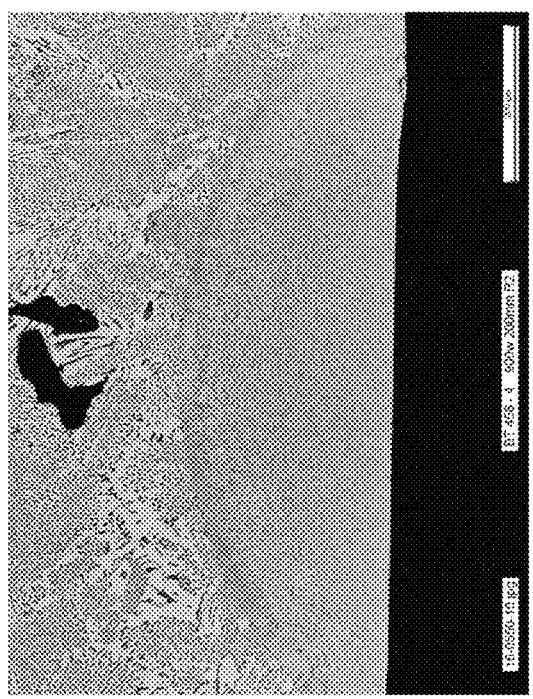
FIG. 18 is an optical micrograph of an exemplary melt region on a surface-hardened Al-12Ce alloy obtained with a 900 W laser at a rate of 200 mm/minute.
Figure 20:
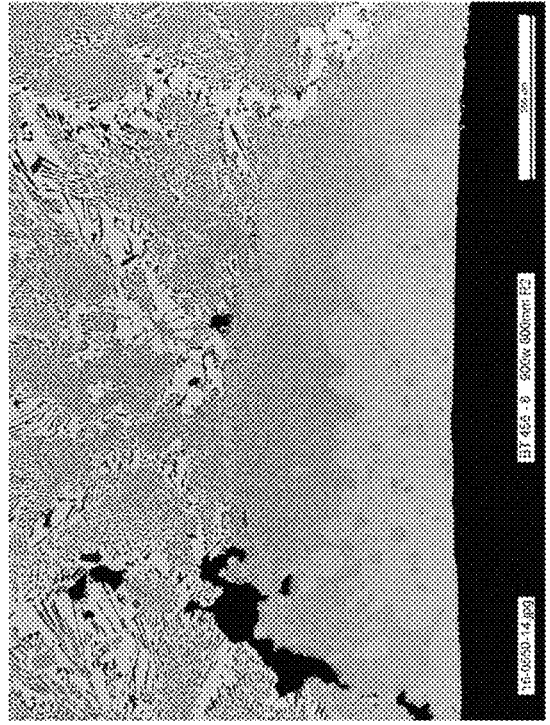
FIG. 20 is an optical micrograph of an exemplary melt region on a surface-hardened Al-12Ce alloy obtained with a 900 W laser at a rate of 800 mm/minute.
Figure 21C:
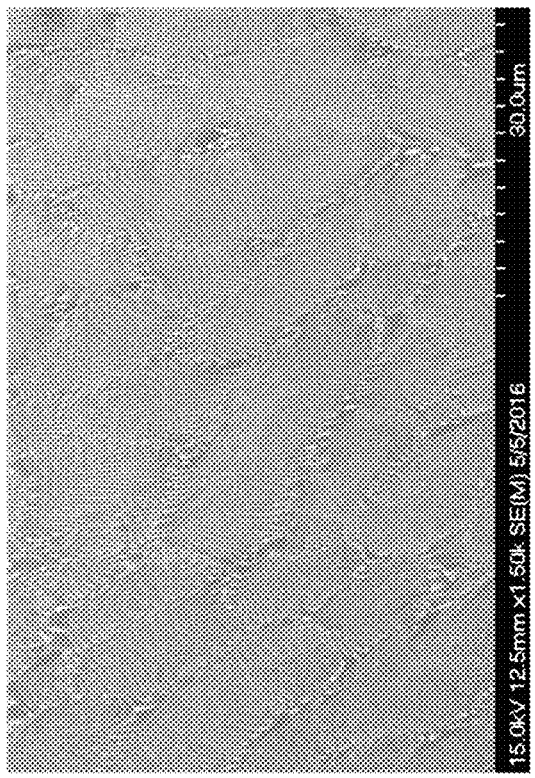
Figure 21E:
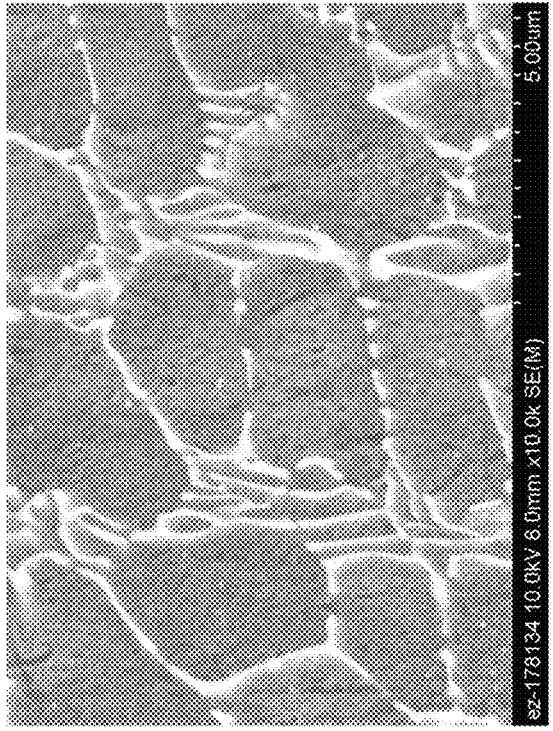
Figure 21B:
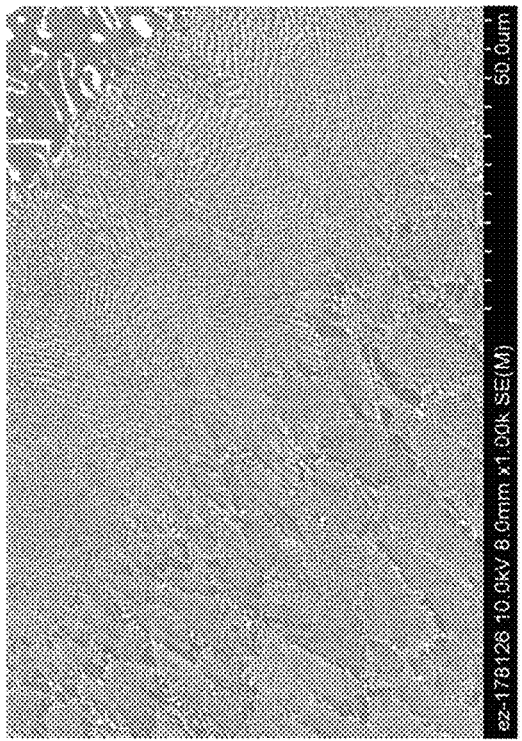
Figure 21D:
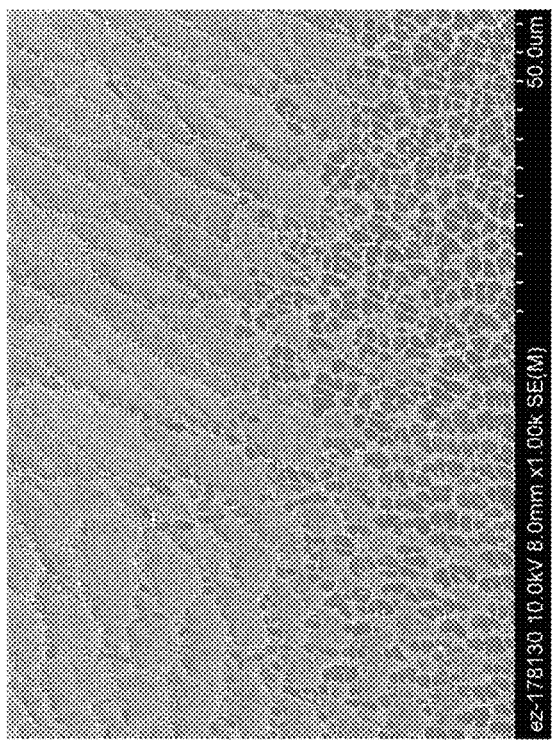
Figure 22D:
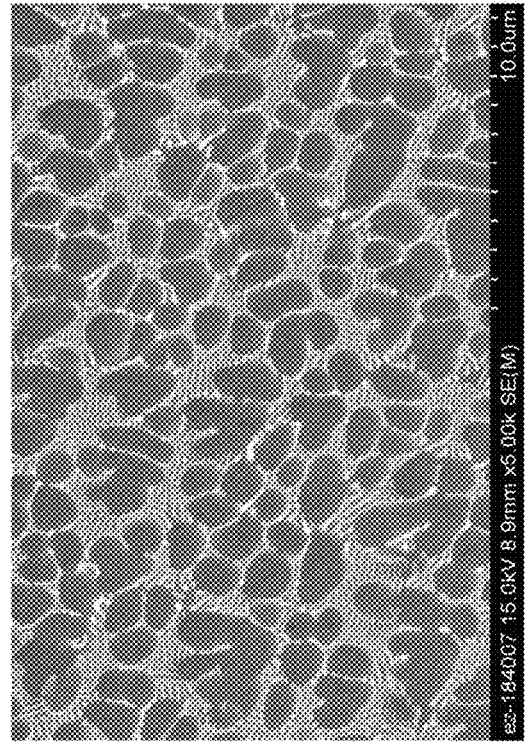
Figure 22F:
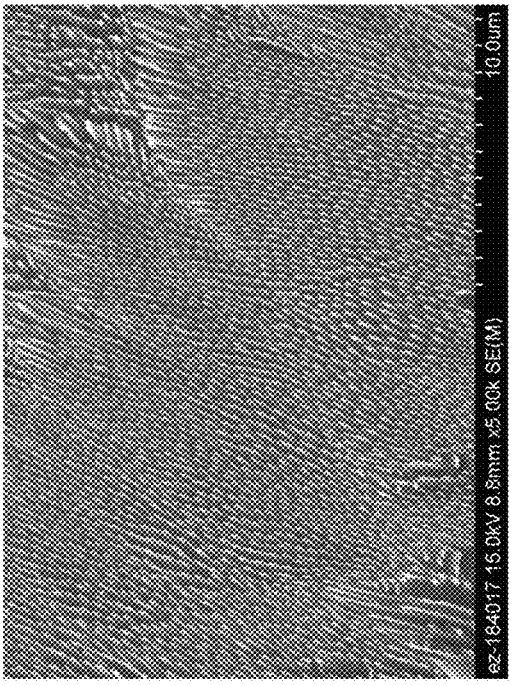
Figure 22C:
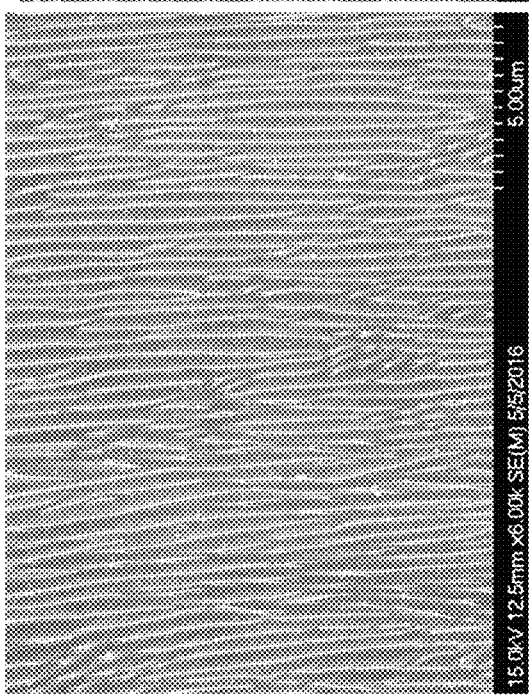
Figure 22E:
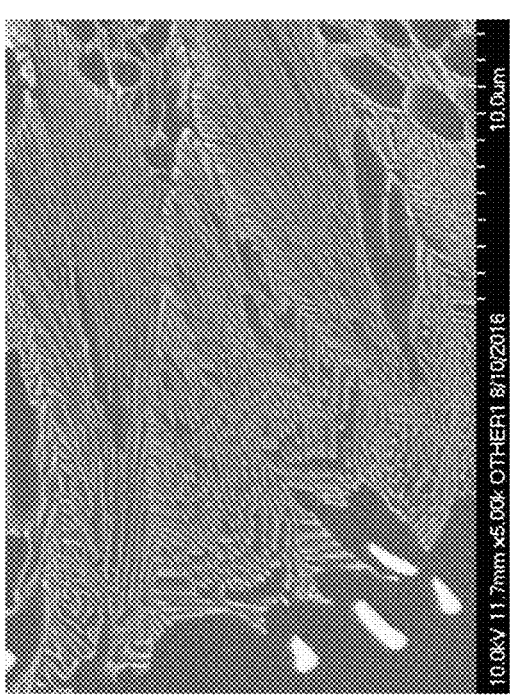
Figure 23B:
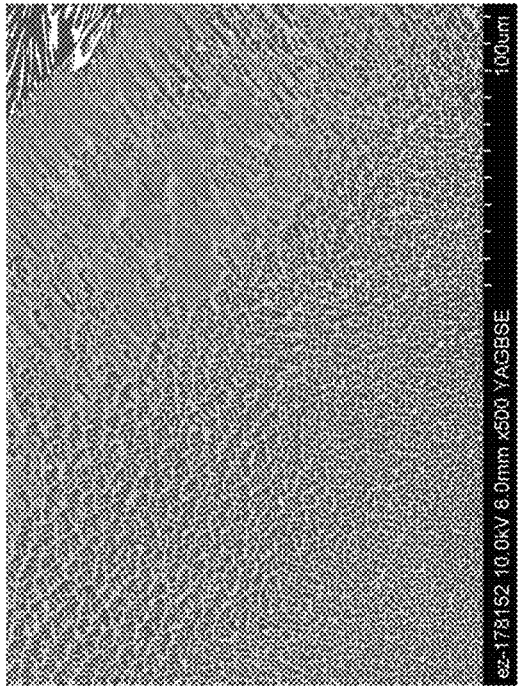
FIGS. 23A-23F are an optical micrograph of an exemplary melt region on a surface-hardened Al-12Ce alloy (23A), an SEM micrograph showing the differences in microstructure with position within the laser-melted region (23B), an SEM micrograph of aluminum dendrites/cells with interdendritic/intercellular eutectic in the laser-melted region (23C), an SEM micrograph near the edge of the laser-melted region showing differences in microstructure with position (23D), an SEM micrographs of the eutectic microstructure near the edge of the laser-melted region after heat treatment at 300° C. for 24 hours, showing no signs of microstructural coarsening (23E), and a high-magnification SEM micrograph of the ultra-fine eutectic structure in the laser-melted region after heat treatment at 300° C. for 24 hours, showing no signs of microstructural coarsening; the melt region was obtained with an 800 W laser at a rate of 300 mm/minute (23F).
Figure 23A:
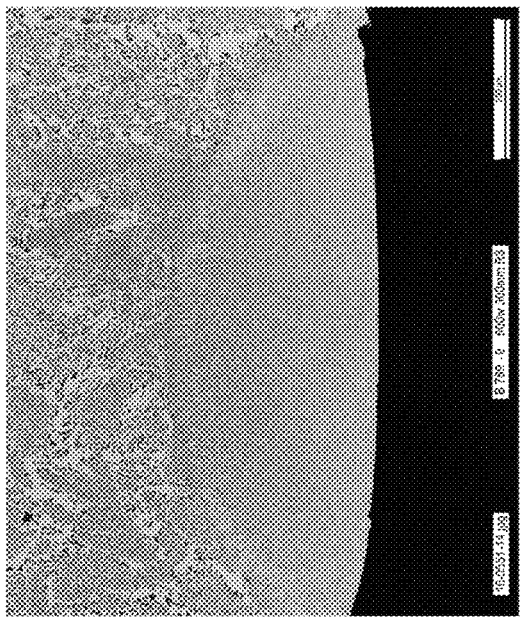
Figure 23D:
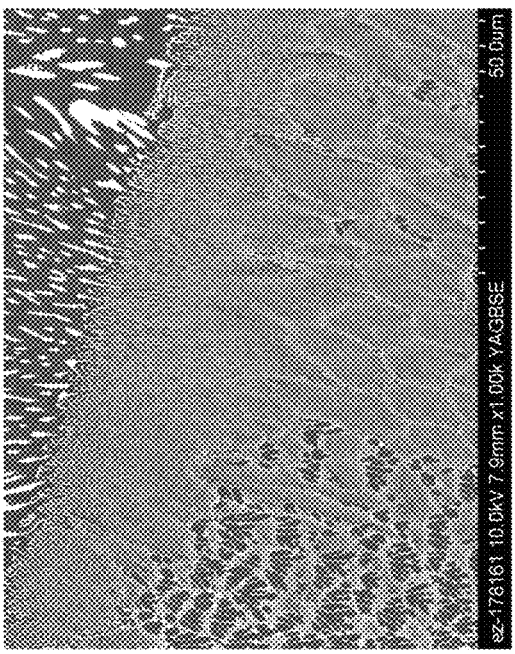
Figure 23C:
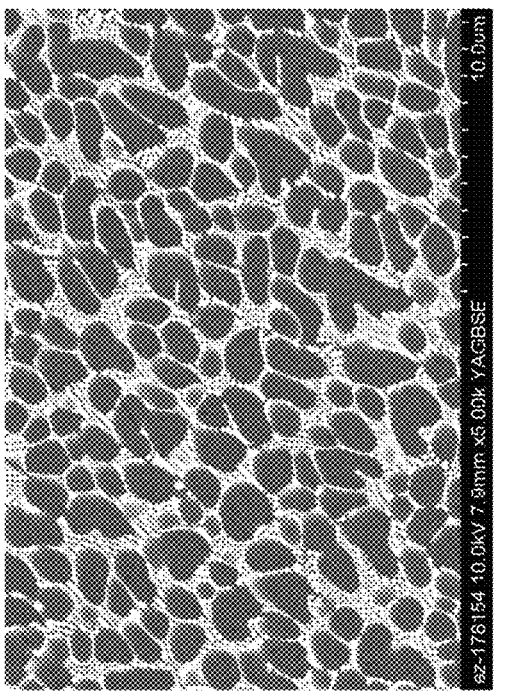
Figure 23F:
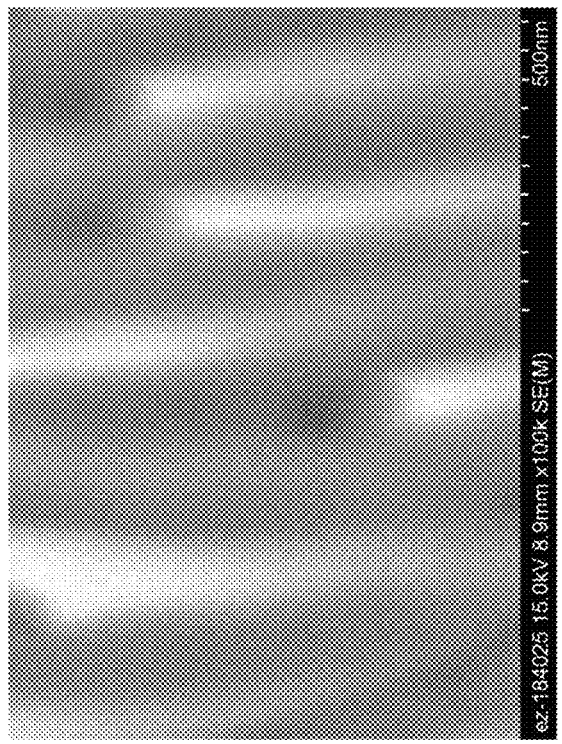
Figure 23E:
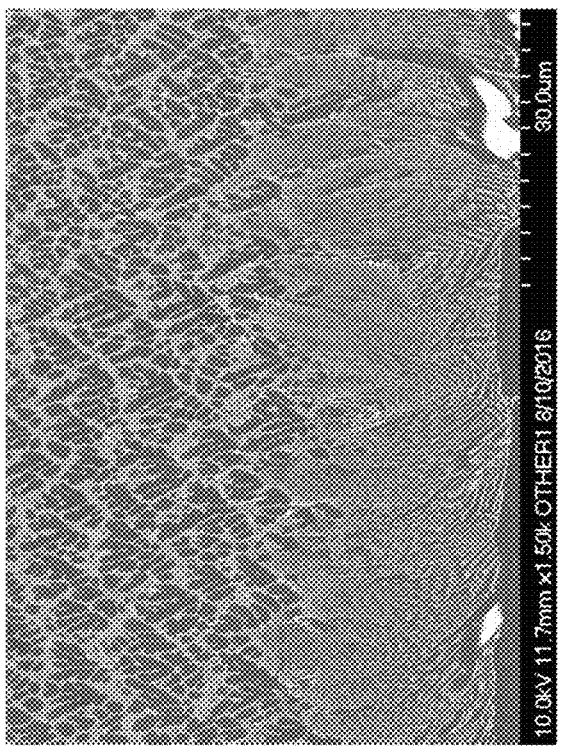

An alloy component of Al-8Ce was prepared as described above. The surface was divided into 9 regions and each region was surface-hardened with a laser under the conditions shown in Table 1. SEM micrographs of melt regions 1-6 were obtained and the melt regions were measured. FIG. 8 shows an exemplary melt region and the dimensions that were evaluated. A line was drawn along the surface outside of the region to serve as a fiducial mark. All other measurements were made perpendicular or parallel to this line. Melt region depth or thickness was measured from the bottom-most melted portion to the surface line. Region height was measured as the height of any bead above the surface line. Melt region width is the width of the region at the surface line, and half-height width is the width of the melt region at half of the melt region depth away from the surface line.

TABLE 1

| Al—8Ce | | | | | | | | | |
|---|---|---|---|---|---|---|---|---|---|
| | 1 | 2 | 3 | 4 | 5 | 6 | 7 | 8 | 9 |
| Power (W) | 800 | 800 | 800 | 600 | 600 | 600 | 400 | 400 | 400 |
| Rate (mm/min) | 400 | 600 | 800 | 400 | 600 | 800 | 400 | 600 | 800 |
| Melt Region Depth (μm) | 210 | 294 | 246 | 144 | 138 | 81 | — | — | — |
| Surface Height (μm) | 30.7 | 0 | 24 | 33 | 21 | 0 | — | — | — |
| Surface Width (μm) | 863 | 1206 | 1152 | 901 | 888 | 621 | — | — | — |
| Half-Height Width (μm) | 698 | 888 | 912 | 612 | 528 | 267 | — | — | — |
| FIG(S). | 9A-C | 10A-D | 11A-E | 12 | 13 | 14 | — | — | — |

An alloy component of Al-12Ce was prepared as described above. The surface was divided into 9 regions and each region was surface-hardened with a laser under the conditions shown in Table 2. SEM micrographs of the melt regions were obtained and the melt regions were measured.

TABLE 2

| Al—12Ce | | | | | | | | | |
|---|---|---|---|---|---|---|---|---|---|
| | 1 | 2 | 3 | 4 | 5 | 6 | 7 | 8 | 9 |
| Power (W) | 1000 | 1000 | 1000 | 900 | 900 | 900 | 800 | 800 | 800 |
| Rate (mm/min) | 200 | 500 | 800 | 200 | 500 | 800 | 100 | 200 | 300 |
| Melt Region Depth (μm) | 459 | 372 | 393 | 384 | 384 | 414 | 354 | 354 | 348 |
| Surface Height (μm) | 21 | 18.2 | 0 | 0 | 0 | 36 | 24 | 0 | 51 |
| Surface Width (μm) | 1608 | 1473 | 1419 | 1782 | 1398 | 1473 | 1428 | 1350 | 1359 |
| Half-Height Width (μm) | 1353 | 1209 | 1174 | 1077 | 1179 | 1173 | 1148 | 1128 | 1101 |
| FIG(S). | 15A-D | 16 | 17 | 18 | 19 | 20 | 21A-G | 22A-F | 23A-F |

Figure 24:
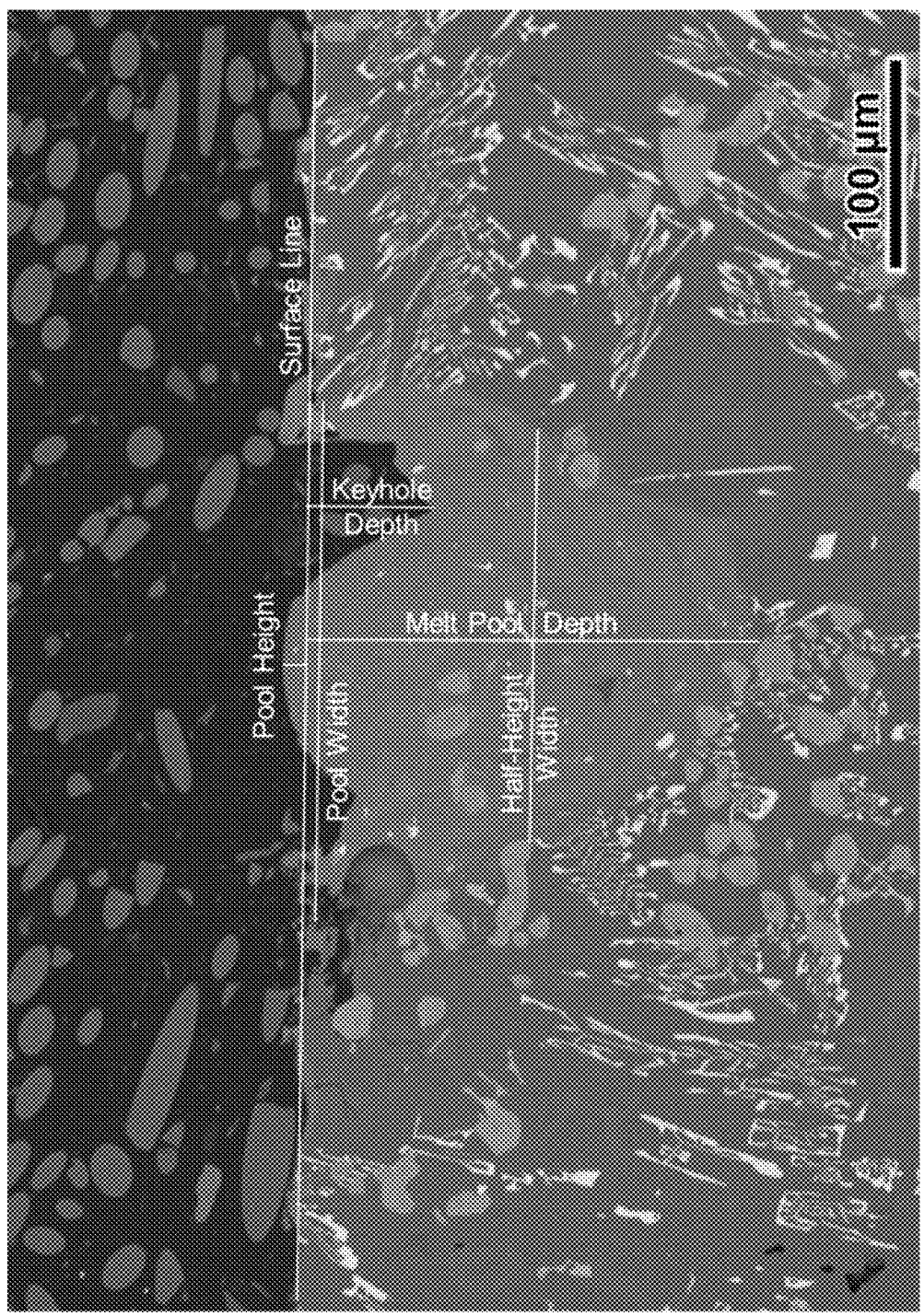
FIG. 24 is an SEM micrograph showing an exemplary melt region on a surface-hardened alloy component and the measurements used to evaluate the melt region.
Figure 25:
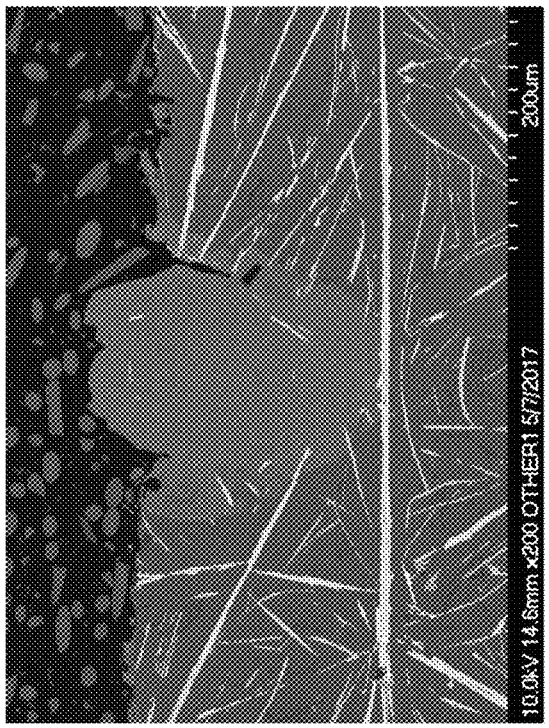
FIG. 25 is an optical micrograph of an exemplary melt region on a surface-hardened Al-8Ce-4Si-1.5Mg-3Ni alloy obtained with a 1000 W laser at a rate of 1.2 m/s with a spot size of 100 µm.
Figure 26:
FIG. 26 is an optical micrograph of an exemplary melt region on a surface-hardened Al-8Ce-4Si-1.5Mg-3Ni alloy obtained with a 1000 W laser at a rate of 2.2 m/s with a spot size of 100 µm.
Figure 27:
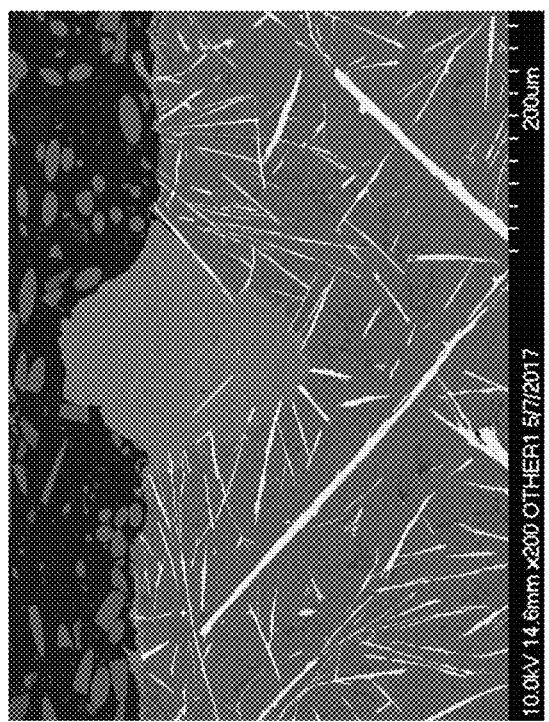
FIG. 27 is an optical micrograph of an exemplary melt region on a surface-hardened Al-8Ce-4Si-1.5Mg-3Ni alloy obtained with a 1000 W laser at a rate of 3.2 m/s with a spot size of 100 µm.
Figure 28:
FIG. 28 is an optical micrograph of an exemplary melt region on a surface-hardened Al-8Ce-4Si-1.5Mg-3Ni alloy obtained with a 1000 W laser at a rate of 1.2 m/s with a spot size of 500 µm.
Figure 30:
FIG. 30 is an optical micrograph of an exemplary melt region on a surface-hardened Al-8Ce-4Si-1.5Mg-3Ni alloy obtained with a 1000 W laser at a rate of 3.2 m/s with a spot size of 500 µm.
Figure 29:
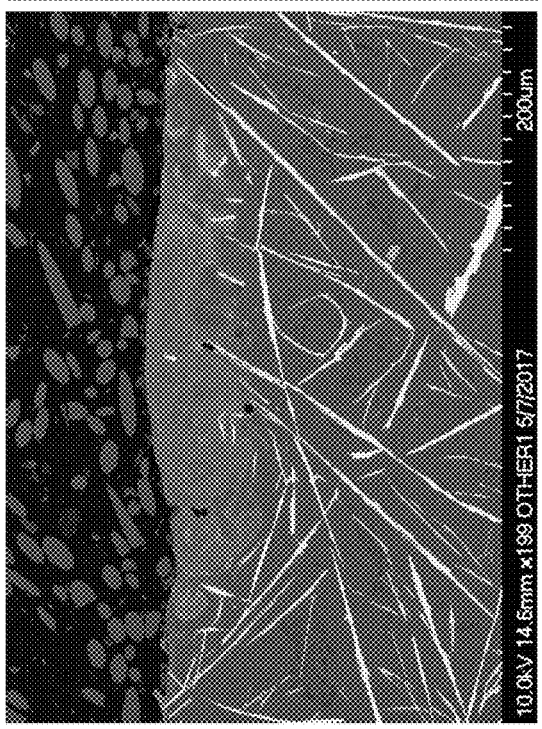
FIG. 29 is an optical micrograph of an exemplary melt region on a surface-hardened Al-8Ce-4Si-1.5Mg-3Ni alloy obtained with a 1000 W laser at a rate of 2.2 m/s with a spot size of 500 µm.
Figure 32:
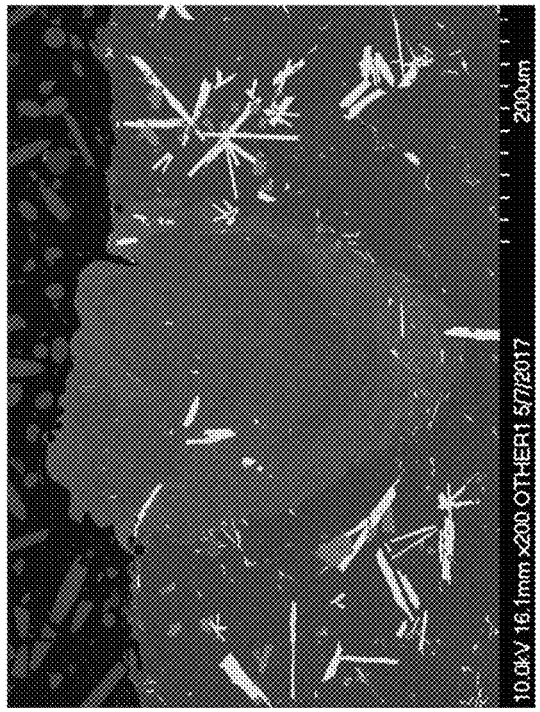
FIG. 32 is an optical micrograph of an exemplary melt region on a surface-hardened Al-8Ce-7Si-4Mg alloy obtained with a 1000 W laser at a rate of 1.2 m/s with a spot size of 100 µm.
Figure 31:
FIG. 31 is an optical micrograph of an exemplary melt region on a surface-hardened Al-8Ce-4Si-1.5Mg-3Ni alloy obtained with a 1000 W laser at a rate of 5 m/s with a spot size of 100 µm.
Figure 33:
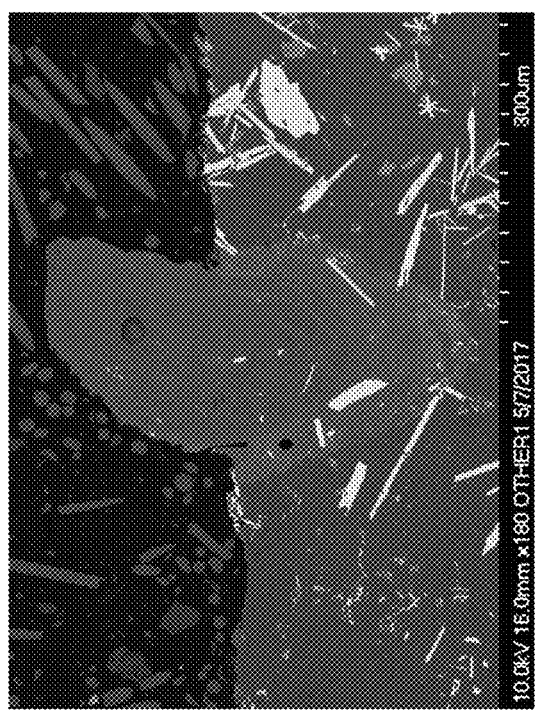
FIG. 33 is an optical micrograph of an exemplary melt region on a surface-hardened Al-8Ce-7Si-4Mg alloy obtained with a 1000 W laser at a rate of 2.2 m/s with a spot size of 100 µm.
Figure 34:
FIG. 34 is an optical micrograph of an exemplary melt region on a surface-hardened Al-8Ce-7Si-4Mg alloy obtained with a 1000 W laser at a rate of 3.2 m/s with a spot size of 100 µm.
Figure 35:
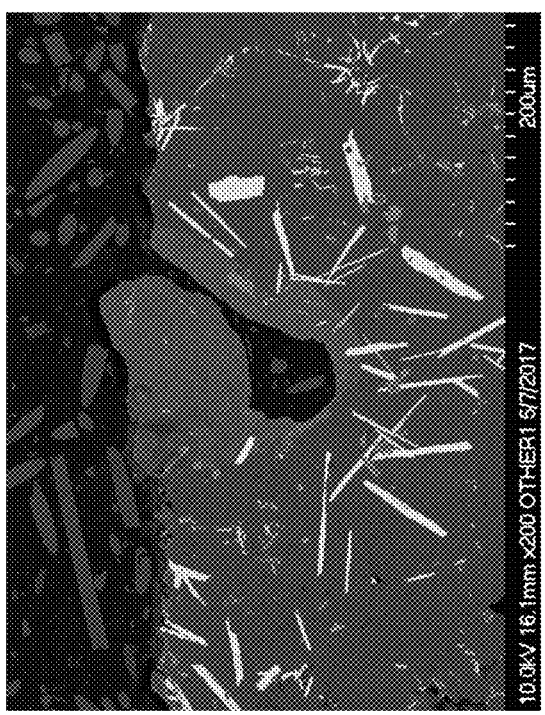
FIG. 35 is an optical micrograph of an exemplary melt region on a surface-hardened Al-8Ce-7Si-4Mg alloy obtained with a 1000 W laser at a rate of 1.2 m/s with a spot size of 500 µm.
Figure 36:
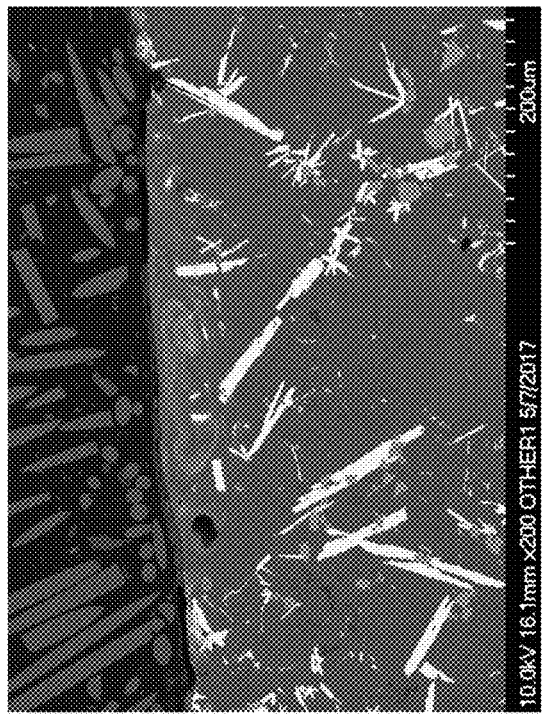
FIG. 36 is an optical micrograph of an exemplary melt region on a surface-hardened Al-8Ce-7Si-4Mg alloy obtained with a 1000 W laser at a rate of 2.2 m/s with a spot size of 500 µm.
Figure 38:
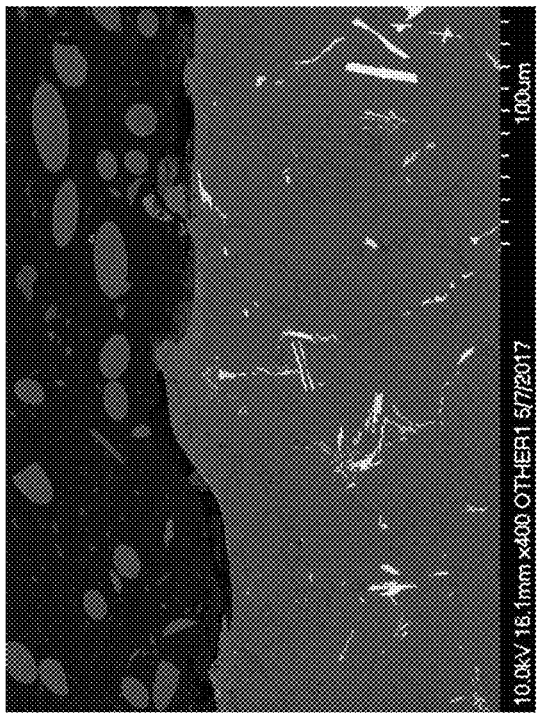
FIG. 38 is an optical micrograph of an exemplary melt region on a surface-hardened Al-8Ce-7Si-4Mg alloy obtained with a 1000 W laser at a rate of 5 m/s with a spot size of 100 µm.
Figure 40:
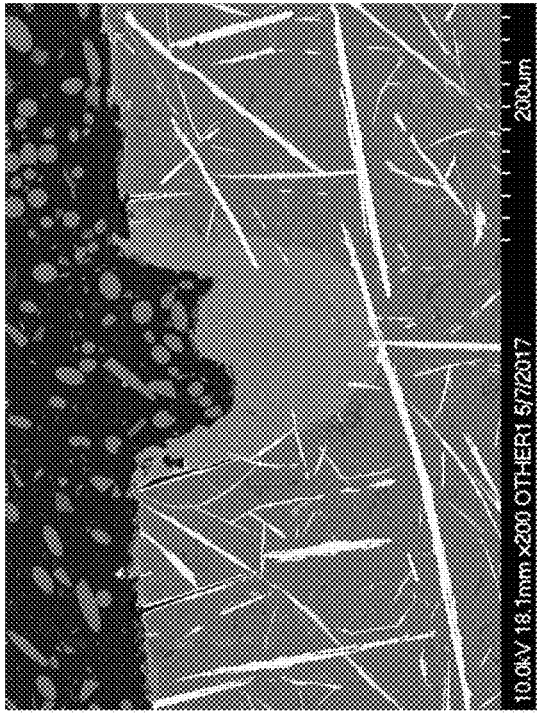
FIG. 40 is an optical micrograph of an exemplary melt region on a surface-hardened Al-8Ce-7Si-1.5Mg-3Ni alloy obtained with a 1000 W laser at a rate of 2.2 m/s with a spot size of 100 µm.
Figure 37:
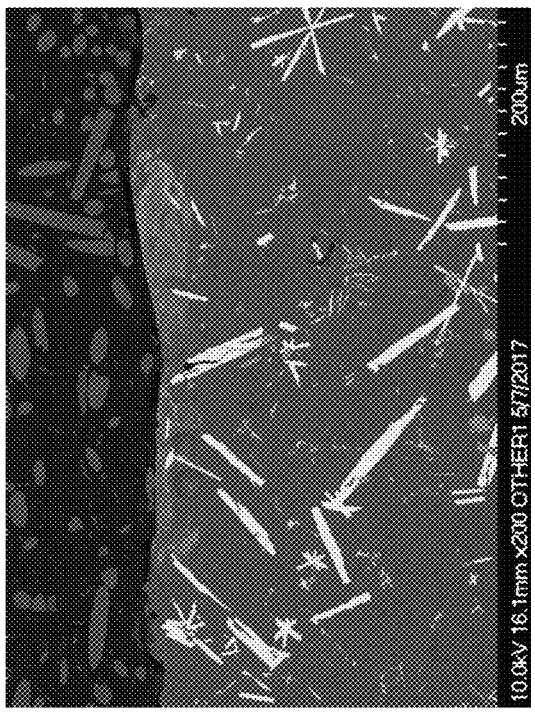
FIG. 37 is an optical micrograph of an exemplary melt region on a surface-hardened Al-8Ce-7Si-4Mg alloy obtained with a 1000 W laser at a rate of 3.2 m/s with a spot size of 500 µm.
Figure 39:
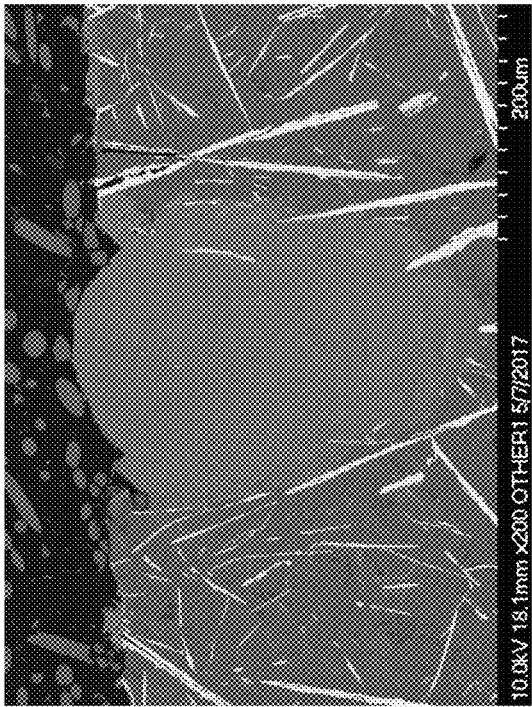
FIG. 39 is an optical micrograph of an exemplary melt region on a surface-hardened Al-8Ce-7Si-1.5Mg-3Ni alloy obtained with a 1000 W laser at a rate of 1.2 m/s with a spot size of 100 µm.
Figure 42:
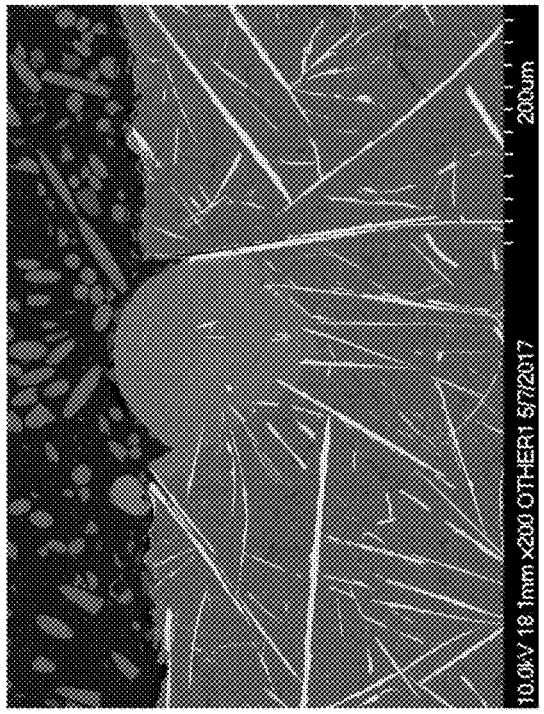
FIG. 42 is an optical micrograph of an exemplary melt region on a surface-hardened Al-8Ce-7Si-1.5Mg-3Ni alloy obtained with a 1000 W laser at a rate of 1.2 m/s with a spot size of 500 µm.
Figure 44:
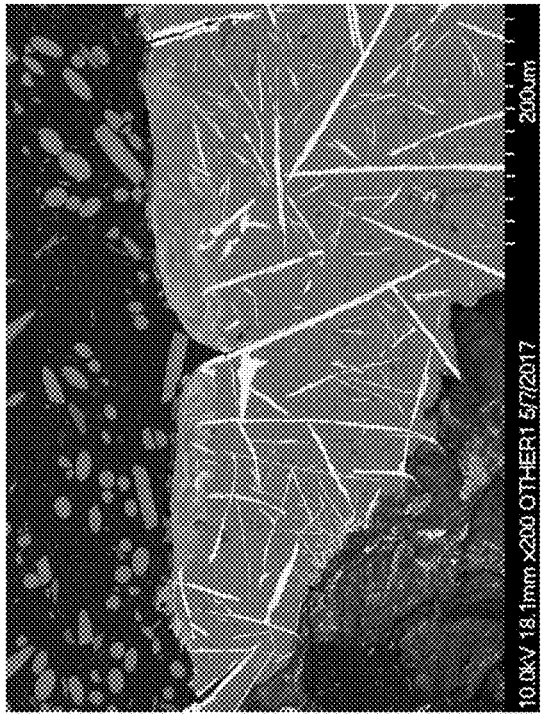
FIG. 44 is an optical micrograph of an exemplary melt region on a surface-hardened Al-8Ce-7Si-1.5Mg-3Ni alloy obtained with a 1000 W laser at a rate of 3.2 m/s with a spot size of 500 µm.
Figure 41:
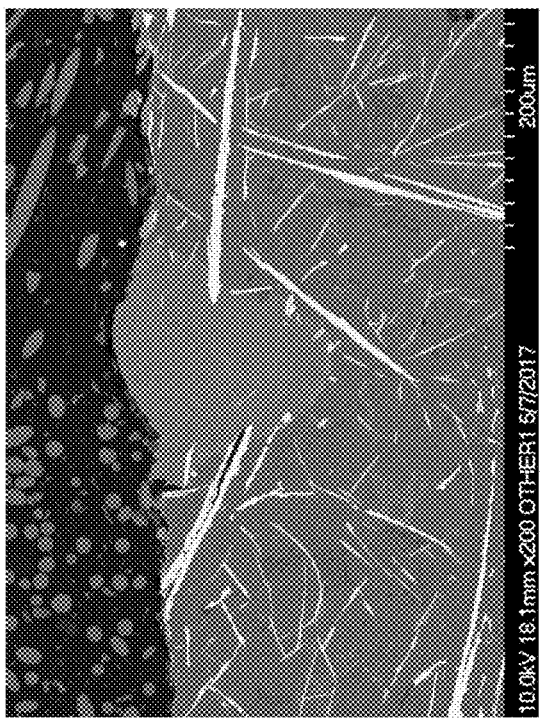
FIG. 41 is an optical micrograph of an exemplary melt region on a surface-hardened Al-8Ce-7Si-1.5Mg-3Ni alloy obtained with a 1000 W laser at a rate of 3.2 m/s with a spot size of 100 µm.
Figure 43:
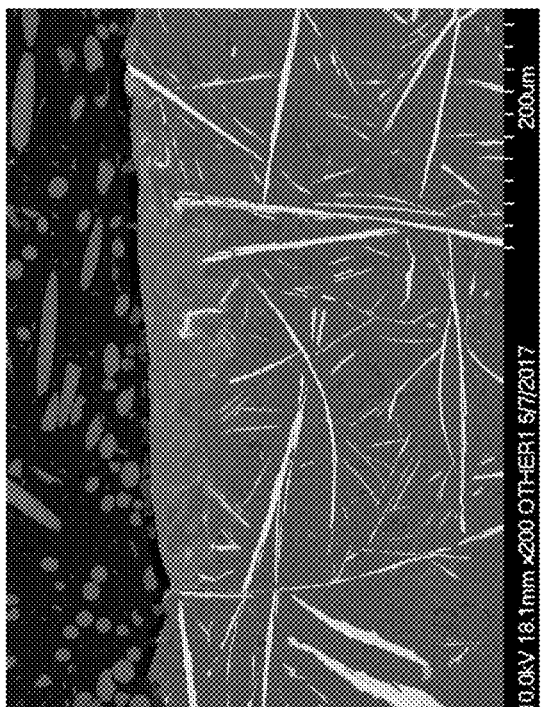
FIG. 43 is an optical micrograph of an exemplary melt region on a surface-hardened Al-8Ce-7Si-1.5Mg-3Ni alloy obtained with a 1000 W laser at a rate of 2.2 m/s with a spot size of 500 µm.
Figure 45:
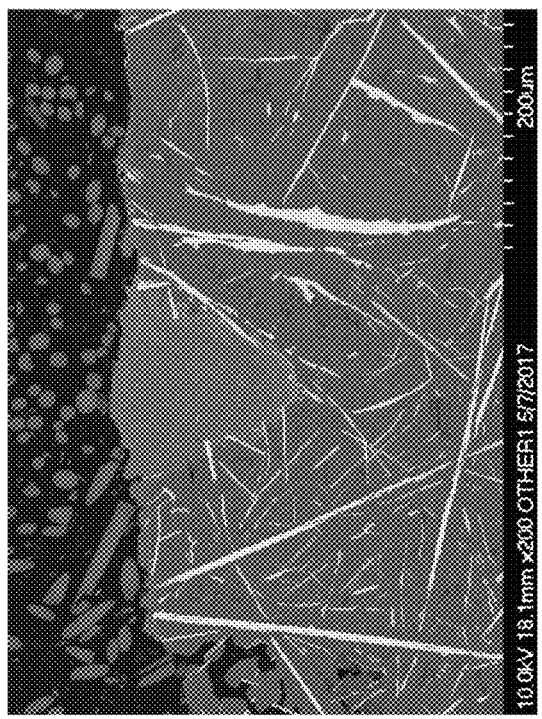
FIG. 45 is an optical micrograph of an exemplary melt region on a surface-hardened Al-8Ce-7Si-1.5Mg-3Ni alloy obtained with a 1000 W laser at a rate of 5 m/s with a spot size of 100 µm.
Figure 46:
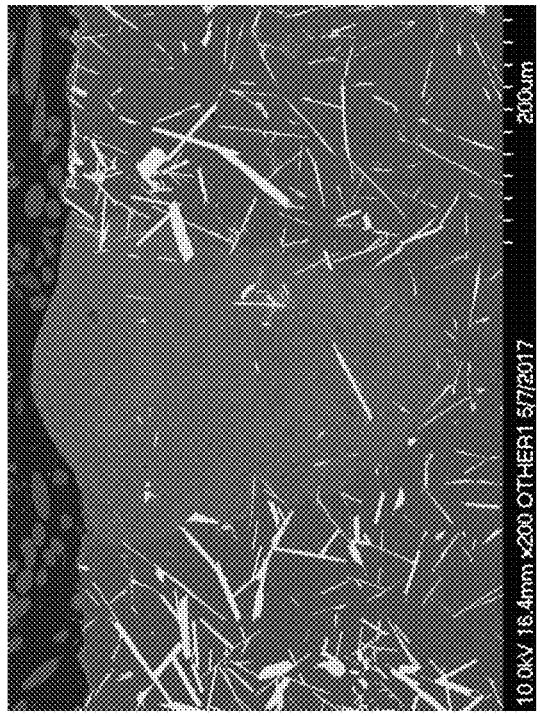
FIG. 46 is an optical micrograph of an exemplary melt region on a surface-hardened Al-12Ce-4Si-0.4Mg alloy obtained with a 1000 W laser at a rate of 1.2 m/s with a spot size of 100 µm.
Figure 47:
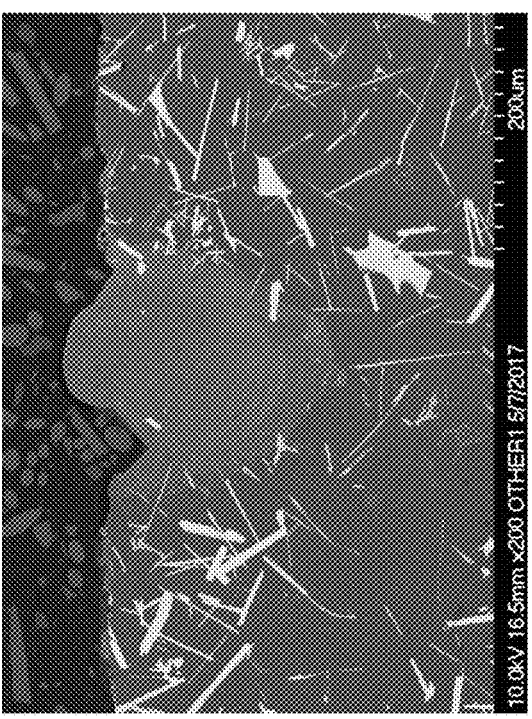
FIG. 47 is an optical micrograph of an exemplary melt region on a surface-hardened Al-12Ce-4Si-0.4Mg alloy obtained with a 1000 W laser at a rate of 2.2 m/s with a spot size of 100 µm.
Figure 48:
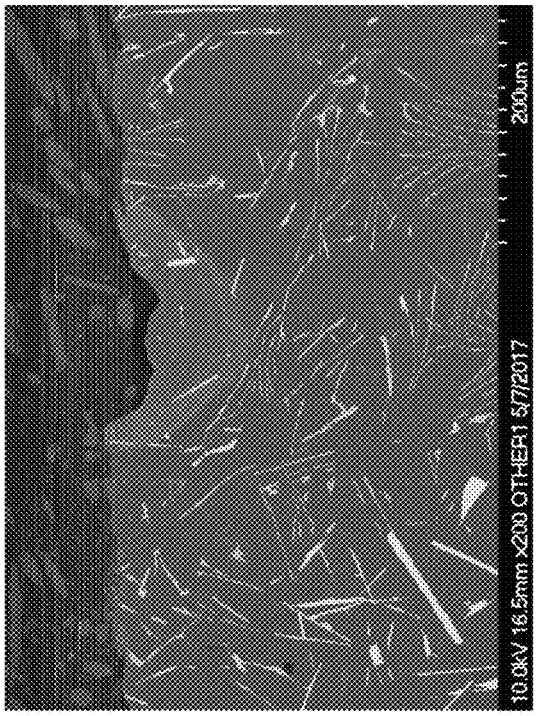
FIG. 48 is an optical micrograph of an exemplary melt region on a surface-hardened Al-12Ce-4Si-0.4Mg alloy obtained with a 1000 W laser at a rate of 3.2 m/s with a spot size of 100 µm.
Figure 49:
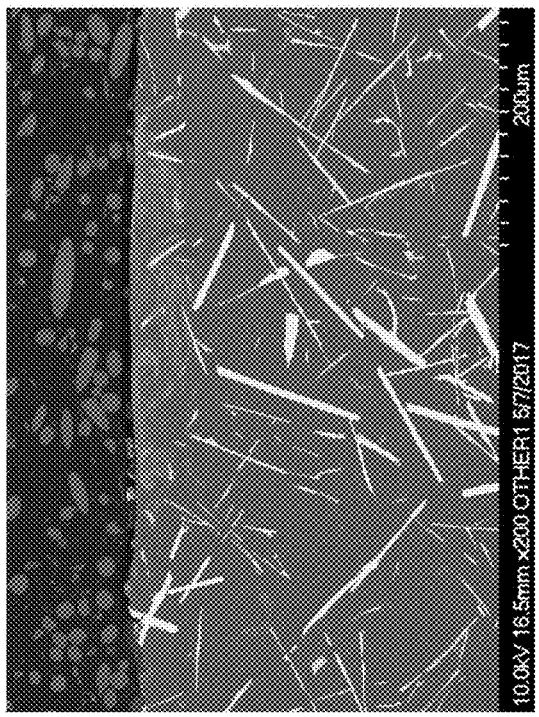
FIG. 49 is an optical micrograph of an exemplary melt region on a surface-hardened Al-12Ce-4Si-0.4Mg alloy obtained with a 1000 W laser at a rate of 1.2 m/s with a spot size of 500 μm.
Figure 50:
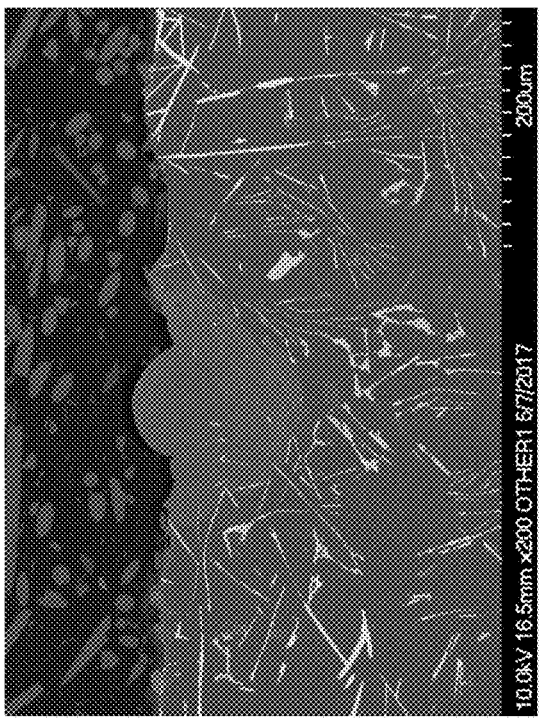
FIG. 50 is an optical micrograph of an exemplary melt region on a surface-hardened Al-12Ce-4Si-0.4Mg alloy obtained with a 1000 W laser at a rate of 2.2 m/s with a spot size of 500 μm.
Figure 51:
FIG. 51 is an optical micrograph of an exemplary melt region on a surface-hardened Al-12Ce-4Si-0.4Mg alloy obtained with a 1000 W laser at a rate of 3.2 m/s with a spot size of 500 μm.
Figure 52:
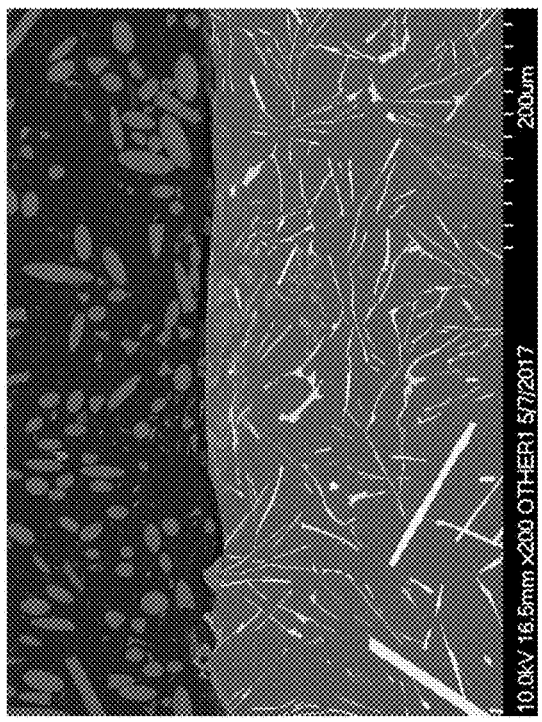
FIG. 52 is an optical micrograph of an exemplary melt region on a surface-hardened Al-12Ce-4Si-0.4Mg alloy obtained with a 1000 W laser at a rate of 5 m/s with a spot size of 100 μm.
Figure 53:
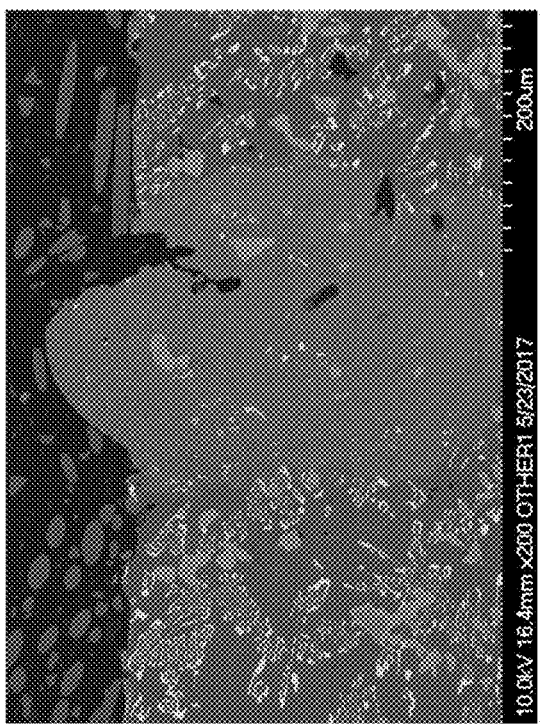
FIG. 53 is an optical micrograph of an exemplary melt region on a surface-hardened Al-8Ce-10Mg alloy obtained with a 1000 W laser at a rate of 1.2 m/s with a spot size of 100 μm.
Figure 54:
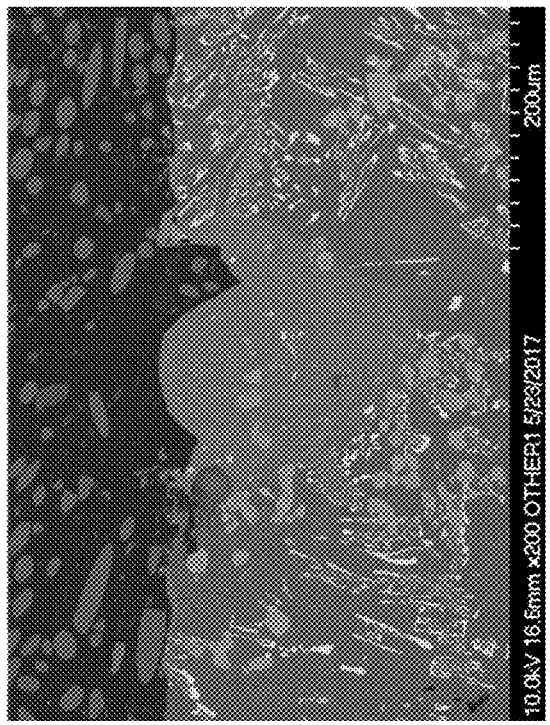
FIG. 54 is an optical micrograph of an exemplary melt region on a surface-hardened Al-8Ce-10Mg alloy obtained with a 1000 W laser at a rate of 2.2 m/s with a spot size of 100 μm.
Figure 55:
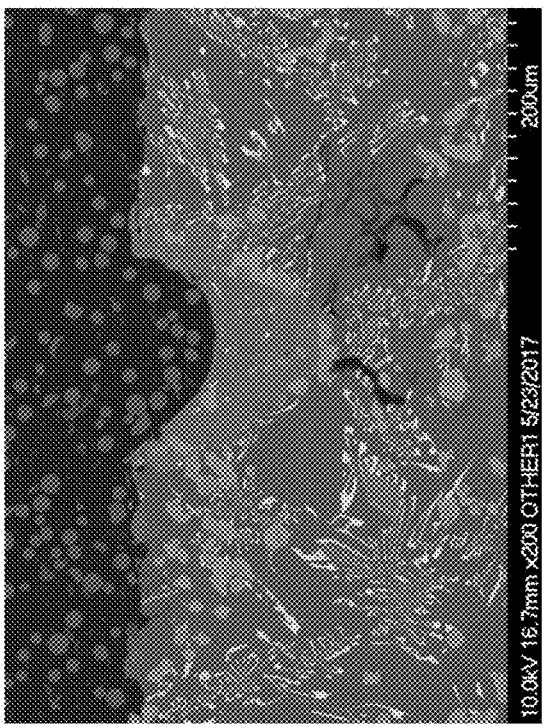
FIG. 55 is an optical micrograph of an exemplary melt region on a surface-hardened Al-8Ce-10Mg alloy obtained with a 1000 W laser at a rate of 3.2 m/s with a spot size of 100 μm.
Figure 56:
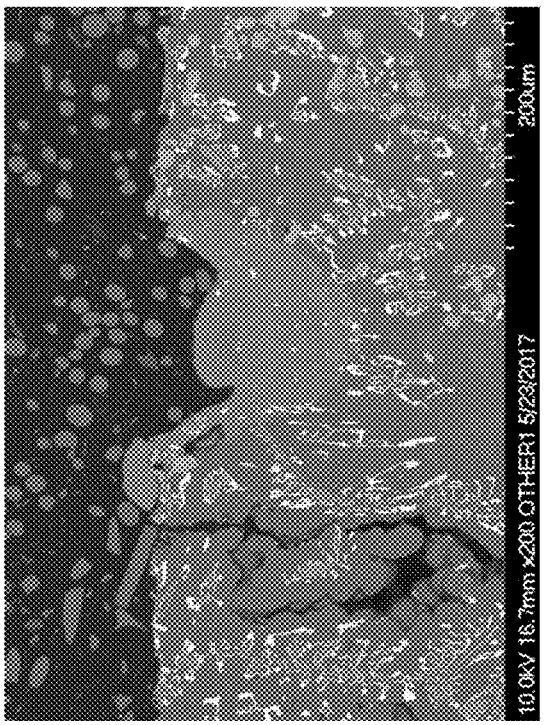
FIG. 56 is an optical micrograph of an exemplary melt region on a surface-hardened Al-8Ce-10Mg alloy obtained with a 1000 W laser at a rate of 1.2 m/s with a spot size of 500 μm.
Figure 57:
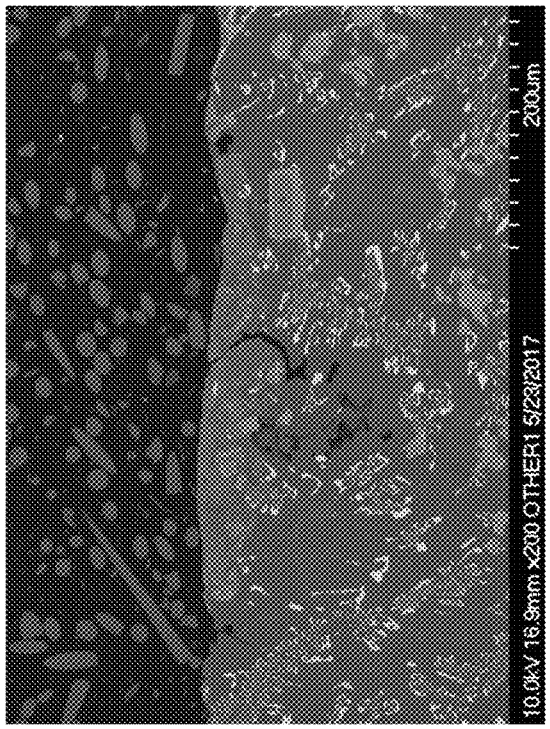
FIG. 57 is an optical micrograph of an exemplary melt region on a surface-hardened Al-8Ce-10Mg alloy obtained with a 1000 W laser at a rate of 2.2 m/s with a spot size of 500 μm.
Figure 58:
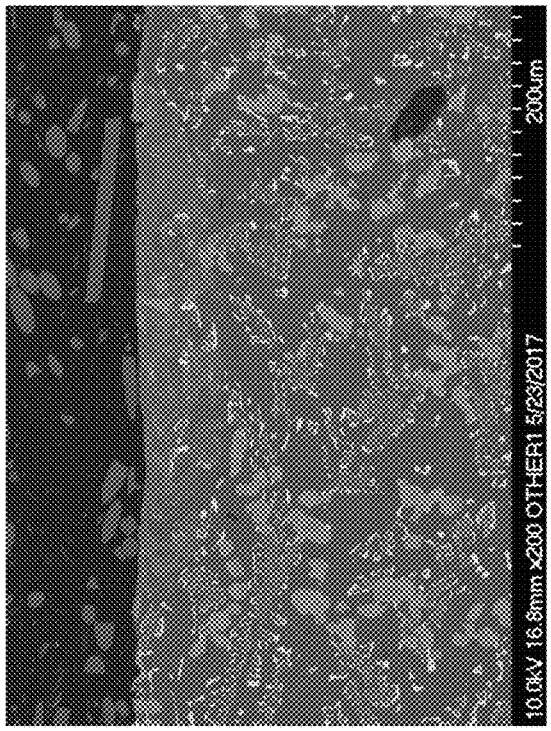
FIG. 58 is an optical micrograph of an exemplary melt region on a surface-hardened Al-8Ce-10Mg alloy obtained with a 1000 W laser at a rate of 3.2 m/s with a spot size of 500 μm.
Figure 59:
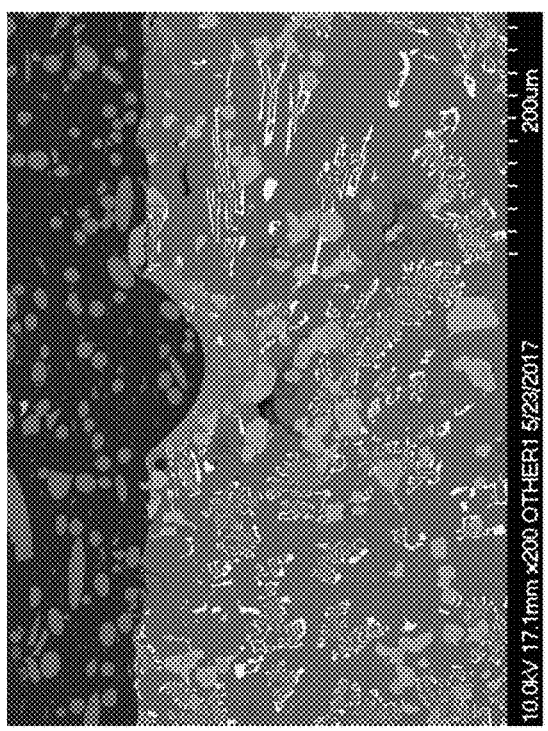
FIG. 59 is an optical micrograph of an exemplary melt region on a surface-hardened Al-8Ce-10Mg alloy obtained with a 1000 W laser at a rate of 5 m/s with a spot size of 100 μm.

Ternary and quaternary (and higher) alloys were prepared in a similar fashion to the previously mentioned binary alloys, cast, and surface hardened in single-line scans using a laser having a variable speed and laser spot size (i.e., the diameter of the laser beam incident on the surface). FIG. 24 is an SEM micrograph showing an exemplary melt region on a surface-hardened alloy component and the measurements used to evaluate the melt region when a rapid laser movement rate was used. A line was drawn along the surface outside of the region to serve as a fiducial mark. All other measurements were made perpendicular or parallel to this line. Melt region depth or thickness was measured from the bottom-most melted portion to the surface line. Keyhole depth was measured from the bottom of any porosity to the surface line. A "keyhole" is a porosity that may form when moving the laser (or the alloy component) rapidly. The rapid movement may result in some turbulence within the melt region and/or fast solidification from sides of the melt region and some shrinkage as solidification occurs. Region height was measured as the height of any bead above the surface line. Melt region width is the width of the region at the surface line, and half-height width is the width of the melt region at half of the melt region depth away from the surface line.

TABLE 3

| Al—8Ce—4Si—1.5Mg—3Ni | | | | | | | |
|---|---|---|---|---|---|---|---|
| | 1 | 2 | 3 | 4 | 5 | 6 | 7 |
| Power (W) | 1000 | 1000 | 1000 | 1000 | 1000 | 1000 | 1000 |
| Rate (m/s) | 1.2 | 2.2 | 3.2 | 1.2 | 2.2 | 3.2 | 5 |
| Spot Size (μm) | 100 | 100 | 100 | 500 | 500 | 500 | 100 |
| Melt Region Depth (μm) | 371.4 | 211.7 | 143.8 | 143.8 | 88.6 | 58.4 | 108.5 |
| Surface Height (μm) | 11.6 | 52.4 | 38.5 | 81.9 | 21.2 | 28 | 38.5 |
| Surface Width (μm) | 275.0 | 270.8 | 259.3 | 246.8 | 543 | 406 | 221.4 |
| Half-Height Width (μm) | 229.3 | 213.7 | 153.7 | 137.5 | 456 | 347 | 115 |

TABLE 3-continued

| | Al—8Ce—4Si—1.5Mg—3Ni | | | | | | |
|---|---|---|---|---|---|---|---|
| | 1 | 2 | 3 | 4 | 5 | 6 | 7 |
| Keyhole Depth (μm) | 144.7 | 75.3 | 72.4 | 0 | 11.9 | 54.7 | 8 |
| FIG. | 25 | 26 | 27 | 28 | 29 | 30 | 31 |

TABLE 4

| | Al—8Ce—7Si—4Mg | | | | | | |
|---|---|---|---|---|---|---|---|
| | 1 | 2 | 3 | 4 | 5 | 6 | 7* |
| Power (W) | 1000 | 1000 | 1000 | 1000 | 1000 | 1000 | 1000 |
| Rate (m/s) | 1.2 | 2.2 | 3.2 | 1.2 | 2.2 | 3.2 | 5 |
| Spot Size (μm) | 100 | 100 | 100 | 500 | 500 | 500 | 100 |
| Melt Region Depth (μm) | 310.9 | 254.152 | 161.5 | 181.8 | 62.9 | 43.1 | |
| Surface Height (μm) | 75 | 177.5 | 0 | 50.1 | 10.3 | 13.3 | |
| Surface Width (μm) | 317.4 | 244.7 | 256.5 | 227 | 575.1 | 417.7 | |
| Half-Height Width (μm) | 261.6 | 204.3 | 189.5 | 173 | 399.8 | 353.8 | |
| Keyhole Depth (μm) | 18.3 | 24.7 | 60.4 | 159.6 | 25 | 12.9 | |
| FIG. | 32 | 33 | 34 | 35 | 36 | 37 | 38 |

*Melt region too small to measure.

TABLE 5

| | Al—8Ce—7Si—1.5Mg—3Ni | | | | | | |
|---|---|---|---|---|---|---|---|
| | 1 | 2 | 3 | 4 | 5 | 6 | 7 |
| Power (W) | 1000 | 1000 | 1000 | 1000 | 1000 | 1000 | 1000 |
| Rate (m/s) | 1.2 | 2.2 | 3.2 | 1.2 | 2.2 | 3.2 | 5 |
| Spot Size (μm) | 100 | 100 | 100 | 500 | 500 | 500 | 100 |
| Melt Region Depth (μm) | 343.9 | 222.6 | 156.4 | 153.7 | 82.7 | 59.6 | 142.6 |
| Surface Height (μm) | 30.6 | 8.3 | 39.8 | 27.9 | 5 | 4 | 26.2 |
| Surface Width (μm) | 288.4 | 260.8 | 231 | 206.8 | 482.3 | 483.2 | 199 |
| Half-Height Width (μm) | 258.4 | 192.1 | 134.6 | 155.8 | 409.1 | 414.2 | 122.1 |
| Keyhole Depth (μm) | 27.2 | 94.4 | 19.9 | 38.5 | 12 | 64.2 | 0 |
| FIG. | 39 | 40 | 41 | 42 | 43 | 44 | 45 |

TABLE 6

| | Al—12Ce—4Si—0.4Mg | | | | | | |
|---|---|---|---|---|---|---|---|
| | 1 | 2 | 3 | 4 | 5 | 6 | 7 |
| Power (W) | 1000 | 1000 | 1000 | 1000 | 1000 | 1000 | 1000 |
| Rate (m/s) | 1.2 | 2.2 | 3.2 | 1.2 | 2.2 | 3.2 | 5 |
| Spot Size (μm) | 100 | 100 | 100 | 500 | 500 | 500 | 100 |
| Melt Region Depth (μm) | 399.7 | 205 | 129.5 | 135.1 | 56.3 | 38.4 | 119.2 |
| Surface Height (μm) | 43.7 | 41.4 | 13.3 | 24.2 | 9.9 | 11.2 | 10.3 |

TABLE 6-continued

| Al—12Ce—4Si—0.4Mg | | | | | | | |
|---|---|---|---|---|---|---|---|
| | 1 | 2 | 3 | 4 | 5 | 6 | 7 |
| Surface Width (μm) | 304.1 | 241.8 | 240.1 | 231.5 | 420.9 | 367.6 | 204.3 |
| Half-Height Width (μm) | 233.2 | 202.7 | 167.2 | 160.6 | 311.9 | 324.9 | 146.4 |
| Keyhole Depth (μm) | 0 | 36.1 | 38.1 | 14.9 | 0 | 0 | 56.6 |
| FIG. | 46 | 47 | 48 | 49 | 50 | 51 | 52 |

TABLE 7

| Al—8Ce—10Mg | | | | | | | |
|---|---|---|---|---|---|---|---|
| | 1 | 2 | 3 | 4 | 5 | 6 | 7 |
| Power (W) | 1000 | 1000 | 1000 | 1000 | 1000 | 1000 | 1000 |
| Rate (m/s) | 1.2 | 2.2 | 3.2 | 1.2 | 2.2 | 3.2 | 5 |
| Spot Size (μm) | 100 | 100 | 100 | 500 | 500 | 500 | 100 |
| Melt Region Depth (μm) | 433.3 | 222.2 | 170.8 | 176.5 | 75.6 | 59.6 | 112.3 |
| Surface Height (μm) | 75.3 | 10 | 9 | 12.9 | 6.3 | 10.3 | 0 |
| Surface Width (μm) | 282.9 | 271 | 211.9 | 236.2 | 471.3 | 457.9 | 170.9 |
| Half-Height Width (μm) | 280.3 | 211.7 | 171.5 | 174.2 | 402.7 | 369.2 | 128.2 |
| Keyhole Depth (μm) | 97.2 | 62.7 | 64.3 | 63 | 7 | 70.9 | 55.6 |
| FIG. | 53 | 54 | 55 | 56 | 57 | 58 | 59 |

Figure 60:
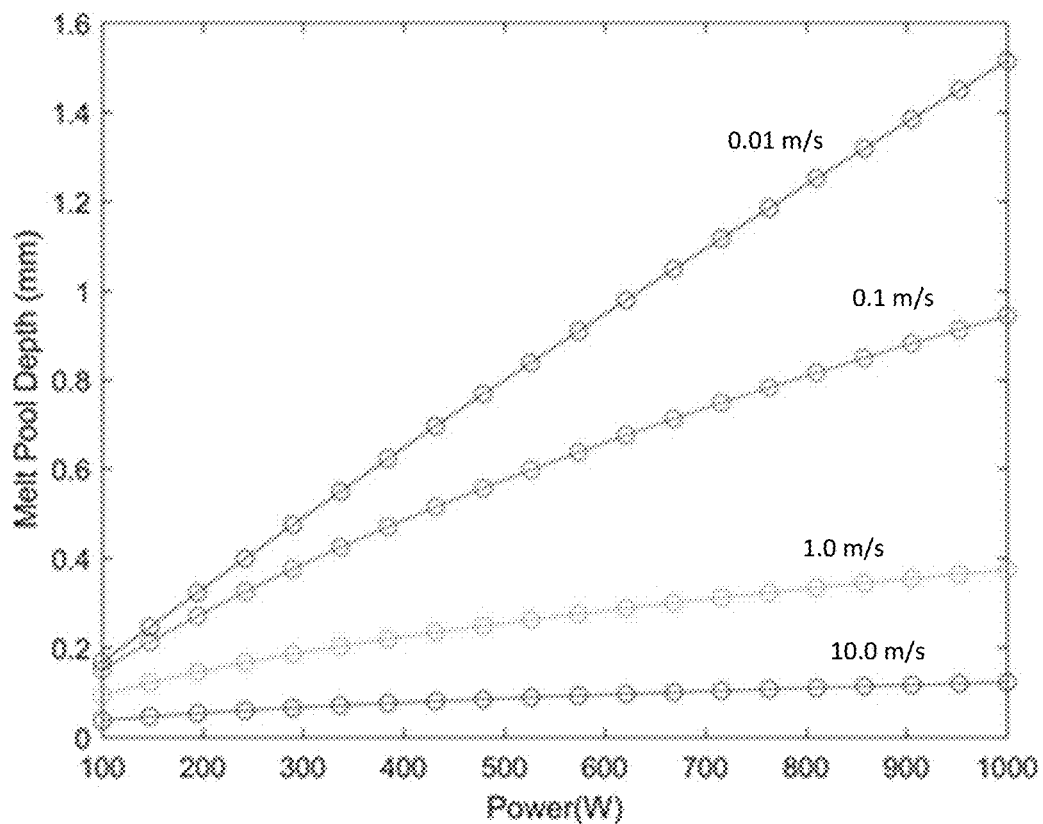
FIG. 60 is a graph showing the effects of laser power and velocity on the depth or thickness of the weld or melt region.

As shown in the foregoing tables, weld/melt pool/region depth depends at least in part on laser power and rate of movement (velocity). FIG. 60 is a graph showing a mathematical model for the melt pool depth. The model is based on the simple moving point source solution originally developed by Rosenthal (Rosenthal, *Weld J* 20 (1941) 220-234; Rosenthal, *Trans. Am Soc. Mech. Eng.* 68 (1946) 849-866). It assumes a semi-infinite domain with a heat source moving at a constant velocity. The solution is steady-state in a reference frame that is moving at the velocity of the heat source. The temperature at a given point T(x,R) using this model is given as $$T(x, R) = T_0 + \frac{P}{2\pi kR}\exp\left(-\frac{v}{2\alpha}(R+x)\right), \quad (1)$$

where $T_0$ is the initial temperature of the plate, P absorbed power, k thermal conductivity, v velocity, α thermal diffusivity, $R=\sqrt{x^2+y^2+z^2}$ is the radial distance between the heat source and the point of interest, where x, y, and z are all coordinates in the moving reference frame, measured relative to the heat source.

This model was applied to approximate the maximum depth of the melt pool as a function of power and velocity. The thermophysical properties were estimated for Al—Si based alloys as given in Table 1. The liquidus temperature used to define the edge of the melt pool was approximated from the Al—Ce phase diagram.

TABLE 8

| Parameters used for evaluation of the model. | |
|---|---|
| Parameter | Value |
| Initial temperature (K) | 300 |
| Thermal conductivity (W/mK) | 150 |
| Density (kg/m³) | 2680 |
| Specific heat (J/kgK) | 920 |
| Liquidus Temperature (K) | 923 |

A search algorithm was used to find the largest melt pool depth for each combination of absorbed laser power and heat source velocity. Greater pool depth is seen when the laser power is increased and/or the velocity is decreased.

Figure 61:
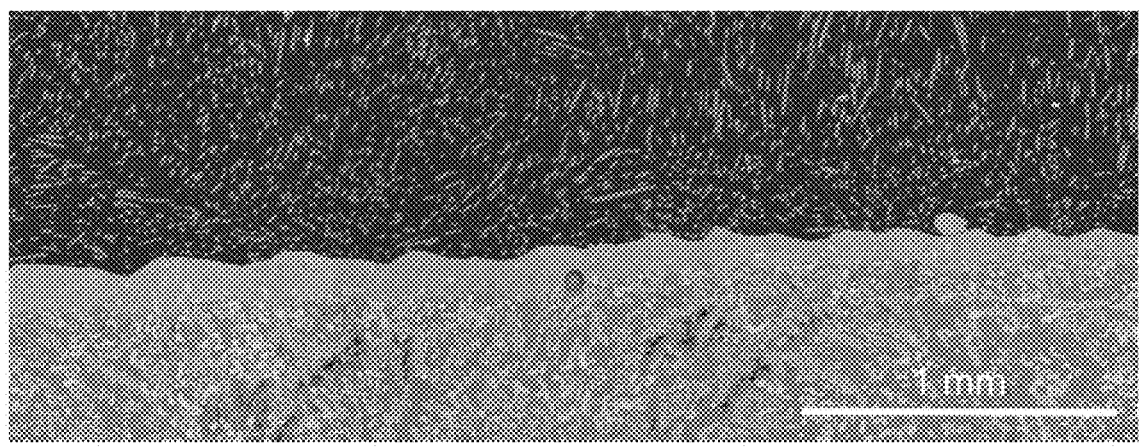
FIG. 61 is an SEM image showing a multi-pass laser-hardened surface of an Al-8Ce-10Mg alloy using a 1 kW laser with a spot size of 400 μm.

As described supra, the entire surface of an alloy component can be surface hardened by rastering a laser or electron beam, or the alloy component itself, so that each area of the alloy surface is melted at least once. Advantageously, the entire surface may be hardened to provide a continuous hardened surface. FIG. 61 is an SEM image showing a multi-pass laser-hardened surface of an Al-8Ce-10Mg alloy using a 1 kW laser with a spot size of 400 μm. The hardened surface was continuous over more than 3 mm, with no evidence of cracking.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A surface-hardened alloy component comprising:
   an alloy comprising aluminum and 4 wt % to 60 wt % of a rare earth component X having a maximum solid solubility of ≤0.5 wt % in aluminum, the surface-hardened alloy component having an alloy bulk portion and a hardened alloy surface portion, at least a portion of the hardened alloy surface portion having a Vickers hardness at a temperature within a range of 20-25° C. that is at least 30% greater than a Vickers hardness of the alloy bulk portion at the temperature within the range of 20-25° C., as measured by ASTM method E384.

2. The surface hardened alloy component of claim 1, wherein the alloy comprises 4 wt % to 20 wt % of the rare earth component X.

3. The surface-hardened alloy component of claim 1, wherein the alloy comprises a bulk metallic phase and an intermetallic phase.

4. The surface-hardened alloy component of claim 3, wherein the alloy comprises from 5 wt % to 30 wt % of the intermetallic phase.

5. The surface hardened alloy component of claim 3, wherein the alloy is a binary alloy of aluminum and the rare earth component X, and the intermetallic phase is an $Al_{11}X_3$ intermetallic phase.

6. The surface-hardened alloy component of claim 3, wherein 95 wt % to 100 wt % of the rare earth component X in the alloy is present in the intermetallic phase.

7. The surface-hardened alloy component of claim 1, wherein:
   the alloy bulk portion comprises a bulk microstructure comprising bulk morphological features;
   the hardened alloy surface portion comprises a surface microstructure comprising surface morphological features; and
   the bulk morphological features have (i) an average thickness at least 2-fold greater than an average thickness of corresponding surface morphological features, (ii) an average spacing at least 2-fold greater than an average spacing of the corresponding surface morphological features, (iii) an average cross-section in a narrow dimension at least 2-fold greater than an average cross-section in a narrow dimension of the corresponding surface morphological features, or (iv) any combination of (i), (ii), and (iii).

8. The surface-hardened alloy component of claim 7, wherein the surface morphological features have a cross-section in a narrow dimension with an average diameter of ≤500 nm.

9. The surface-hardened alloy component of claim 7, wherein the bulk morphological features and the surface morphological features comprise, in part, aluminum regions and lamellae comprising an intermetallic phase.

10. The surface-hardened alloy component of claim 1, wherein the hardened alloy surface portion has an average thickness of from 10 μm to 1.5 mm.

11. The surface-hardened alloy component of claim 1, wherein the rare earth component X has a maximum solid solubility of ≤0.1 wt % in molten aluminum.

12. The surface-hardened alloy component of claim 1, wherein the rare earth component X is Ce, La, mischmetal, or any combination thereof.

13. The surface-hardened alloy component of claim 1, wherein the alloy comprises:
   4 wt % to 60 wt % Ce, La, mischmetal, or any combination thereof;
   0 wt % to 15 wt % Mg;
   0 wt % to 12 wt % Si;
   0 wt % to 6 wt % Fe;
   0 wt % to 5 wt % Ni;
   0 wt % to 6 wt % Zn; and
   aluminum.

14. The surface-hardened alloy component of claim 13, wherein the alloy comprises 4 wt % to 20 wt % Ce.

15. A method for making the surface-hardened alloy component of claim 1, comprising:
   hardening at least a portion of an alloy surface of a prefabricated alloy component comprising aluminum and from 4 wt % to 60 wt % of a rare earth component X having a maximum solid solubility of ≤0.5 wt % in the aluminum by melting the portion of the alloy surface and allowing the melted alloy surface to cool and resolidify, thereby forming a surface-hardened alloy component having an alloy bulk portion and a hardened alloy surface portion, at least a portion of the hardened alloy surface portion having a Vickers hardness at ambient temperature that is at least 30% greater than a Vickers hardness of the alloy bulk portion at ambient temperature, as measured by ASTM method E384.

16. The method of claim 15, wherein melting the portion of the alloy surface comprises moving a laser or an electron beam having a sufficient power to melt the alloy surface of the prefabricated alloy across the alloy surface at a rate sufficient to melt a portion of the alloy surface exposed to the laser or the electron beam.

17. The method of claim 16, wherein the laser or the electron beam is moved across the alloy surface at a rate sufficient to melt the portion of the alloy surface to an average thickness of from 10 μm to 1.5 mm.

18. The method of claim 16, wherein:
   (i) the laser has a power of 100 W to 50 kW;
   (ii) the rate of movement of the laser across the alloy surface is within a range of from 100 mm/minute to 5 m/second;
   (iii) the power and the rate of movement of the laser are selected to provide a molten spot size having an average diameter of from 100 μm to 15 mm in the portion of the alloy surface exposed to the laser; or
   (iv) any combination of (i), (ii), and (iii).

19. The method of claim 15, wherein melting the portion of the alloy surface comprises inducing an electrical current in the portion of the alloy surface, the electrical current having sufficient magnitude to provide resistive-heating and melting of the portion of the alloy surface.

20. The method of claim 15, further comprising forming the prefabricated alloy component by casting, forging, machining, extruding, and/or stamping the alloy to form the prefabricated alloy component.

* * * * *